US009056687B2

(12) United States Patent
Shachor et al.

(10) Patent No.: US 9,056,687 B2
(45) Date of Patent: Jun. 16, 2015

(54) SYSTEMS AND METHODS FOR CONTROLLING AN AERIAL UNIT

(71) Applicants: Gabriel Shachor, Maccabim Reut (IL);
Shy Cohen, Yokneam moshava (IL);
Ronen Keidar, Yokneam moshava (IL);
Zvi Yaniv, Kibutz Megido (IL)

(72) Inventors: Gabriel Shachor, Maccabim Reut (IL);
Shy Cohen, Yokneam moshava (IL);
Ronen Keidar, Yokneam moshava (IL);
Zvi Yaniv, Kibutz Megido (IL)

(73) Assignee: Sky Sapience LTD., Yokneam (IL)

( * ) Notice: Subject to any disclaimer, the term of this patent is extended or adjusted under 35 U.S.C. 154(b) by 0 days.

(21) Appl. No.: 13/759,084

(22) Filed: Feb. 5, 2013

(65) Prior Publication Data

US 2014/0046504 A1 Feb. 13, 2014

Related U.S. Application Data

(63) Continuation-in-part of application No. 13/814,244, filed as application No. PCT/IB2011/055021 on Nov. 10, 2011, now Pat. No. 8,695,919.

(60) Provisional application No. 61/412,816, filed on Nov. 12, 2010.

(51) Int. Cl.
| | |
|---|---|
| B64C 27/00 | (2006.01) |
| B64C 27/08 | (2006.01) |
| B64F 1/12 | (2006.01) |
| B64C 39/02 | (2006.01) |
| B64C 29/04 | (2006.01) |
| B64C 27/04 | (2006.01) |

(52) U.S. Cl.
CPC .............. *B64F 1/12* (2013.01); *B64C 39/022* (2013.01); *B64C 39/024* (2013.01); *B64C 29/04* (2013.01); *B64C 27/04* (2013.01); *B64C 2201/027* (2013.01); *B64C 2201/108* (2013.01); *B64C 2201/122* (2013.01); *B64C 2201/127* (2013.01); *B64C 2201/148* (2013.01)

(58) Field of Classification Search
USPC .......... 244/17.17, 17.11, 17.23, 17.21, 17.19, 244/17.25, 23 C
See application file for complete search history.

(56) References Cited

U.S. PATENT DOCUMENTS

| | | | |
|---|---|---|---|
| 6,781,254 B2 * | 8/2004 | Roberts | 290/55 |
| 7,675,189 B2 * | 3/2010 | Grenier | 290/54 |
| 8,350,403 B2 * | 1/2013 | Carroll | 290/55 |

(Continued)

FOREIGN PATENT DOCUMENTS

WO WO 2007141795 A1 * 12/2007

*Primary Examiner* — Tien Dinh
*Assistant Examiner* — Michael Wang
(74) *Attorney, Agent, or Firm* — Oren Reches

(57) ABSTRACT

An aerial unit, a method and a system are provide, the system includes a ground unit; an aerial unit and a connecting element arranged to connect the ground unit to the aerial unit. The ground unit may include a connecting element manipulator, a ground unit controller for controlling the connecting element manipulator; and a ground unit location sensor arranged to generate ground unit location information indicative of a location of the ground unit. The wherein the aerial unit may include a first propeller, a frame, a first propeller motor, at least one steering element; and an aerial unit location sensor arranged to generate aerial unit location information indicative of a location of the aerial unit. At least one of the ground unit and the aerial unit includes a controller that is arranged to control, at least in response to a relationship between the aerial unit location information and the ground unit location information, at least one of the first propeller motor and the at least one steering element to affect at least one of the location of the aerial unit and an orientation of the aerial unit.

21 Claims, 19 Drawing Sheets

(56) References Cited

U.S. PATENT DOCUMENTS

| | | | |
|---|---|---|---|
| 8,544,788 B1 * | 10/2013 | Capper | 244/33 |
| 8,602,349 B2 * | 12/2013 | Petrov | 244/17.23 |
| 2010/0295303 A1 * | 11/2010 | Lind et al. | 290/44 |

* cited by examiner

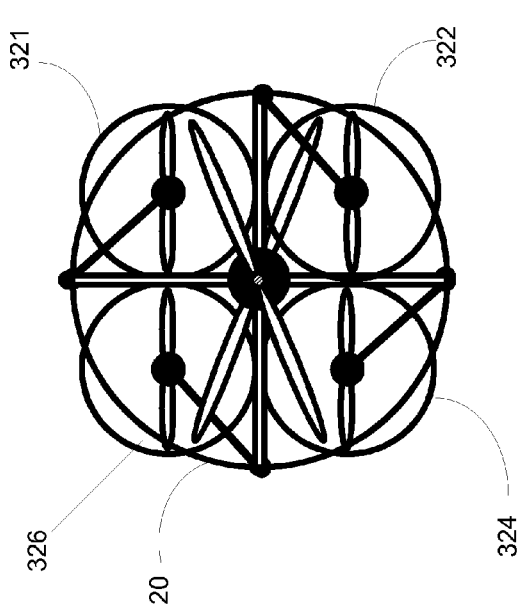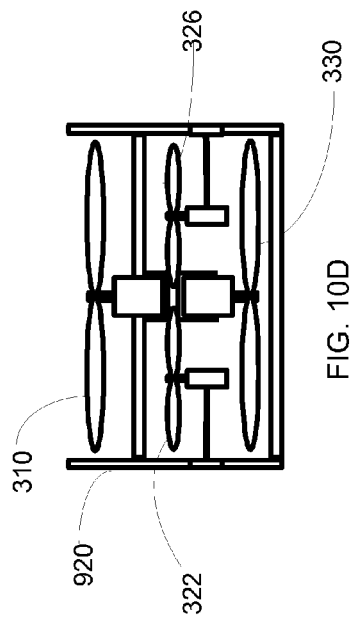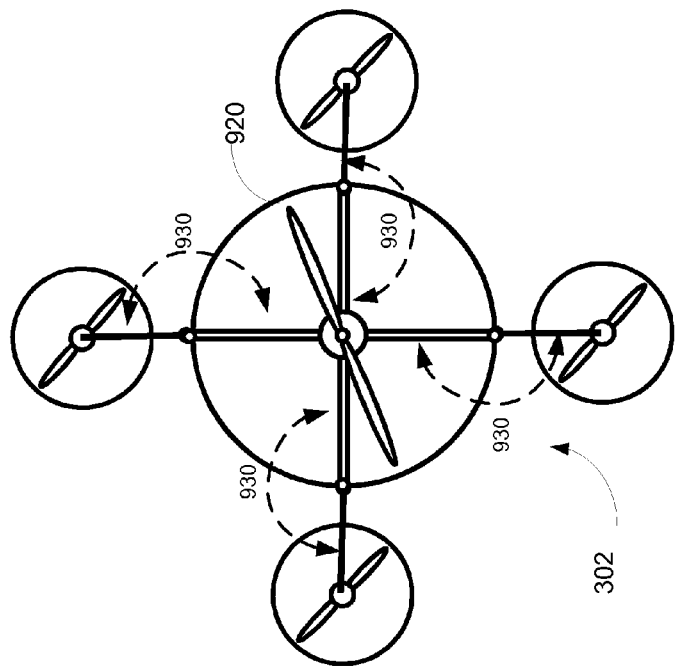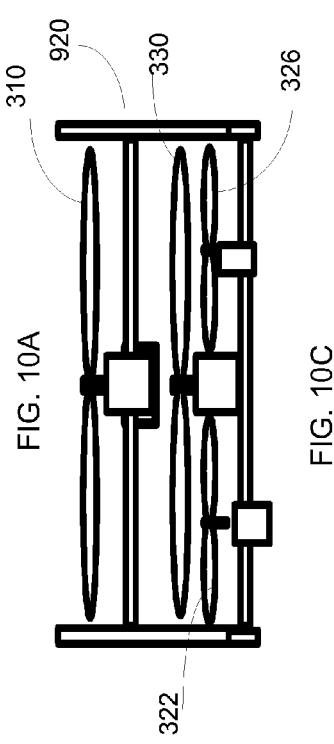
FIG. 10B
FIG. 10D
FIG. 10A
FIG. 10C

SYSTEMS AND METHODS FOR CONTROLLING AN AERIAL UNIT

RELATED APPLICATIONS

This application is a continuation in part of U.S. nonprovisional patent application Ser. No. 13/814,244 filing date Feb. 5, 2013, which is a US national stage of PCT patent application PCT/IB2011/055021 International filing date Nov. 10 2011 that claims priority from US provisional patent 61/412,816 filing date Nov. 12 2010, all incorporated herein by reference in their entirety.

BACKGROUND OF THE INVENTION

Prior art of height observation and signaling equipment (such as observation cameras) are connected to a base unit by using a mast made of rigid metal construction or other stiff materials that supports the equipment.

The mast implements large moments on the base due to its significant height. For example, every single Kg force of wind pressure at the top of a 30 meter height mast will implement a moment of about 30 Kg at one meter on the platform, and a pressure of about 150 Kg on a typical 20 cm diameter base construction. Thus, a heavy duty vehicle is required to support the equipment with its supporting construction.

In addition, the process of lifting the equipment to the destined altitude is time consuming and requires a team work. Tactic balloons and masts suffer from long spreading time, long folding time, large size (about 1 cubic meter of Helium for 300 gram of payload and balloon), bad stability and require highly trained operators.

There is a need for a simpler system and method for lifting equipment for height observation or signaling such as an observation camera.

SUMMARY

According to an embodiment of the invention a system is provided and may include a ground unit; an aerial unit; and a connecting element arranged to connect the ground unit to the aerial unit. The ground unit may include a connecting element manipulator, for altering an effective length of the connecting element; wherein the effective length of the connecting element defines a distance between the ground unit and the aerial unit; a ground unit controller for controlling the connecting element manipulator; and a ground unit location sensor arranged to generate ground unit location information indicative of a location of the ground unit. The aerial unit may include a first propeller; a frame; a first propeller motor that is configured to rotate the first propeller about a first axis, wherein the first propeller motor is connected to the frame; at least one steering element; and an aerial unit location sensor arranged to generate aerial unit location information indicative of a location of the aerial unit. At least one of the ground unit and the aerial unit may include a controller that may be arranged to control, at least in response to a relationship between the aerial unit location information and the ground unit location information, at least one of the first propeller motor and the at least one steering element to affect at least one of the location of the aerial unit and an orientation of the aerial unit.

The controller may be arranged to control the at least one of the first propeller motor and the at least one steering element in order to reduce the horizontal displacement between the ground unit and the aerial unit below a predetermined horizontal displacement threshold.

The controller may be arranged to change the at least one of the location and orientation of the aerial unit only if a horizontal displacement between the ground unit and the aerial unit exceeds a tolerable horizontal displacement threshold.

The aerial unit location sensor and the ground unit location sensor may be global positioning system (GPS) compliant sensors.

The aerial unit location sensor and the ground unit location sensor may be arranged to calculate locations based upon satellite signals.

The controller may be arranged to calculate, based upon changes in values of the ground unit location information, a speed of the ground unit.

The controller may be arranged to affect at least one of the location and orientation of the aerial unit in response to the speed of the ground unit.

The controller may be arranged to calculate, based upon changes in values of the aerial unit location information, a speed of the aerial unit.

The controller may be arranged to calculate required speed and orientation of the aerial unit required to reduce the horizontal displacement between the ground unit and the aerial unit below a predetermined horizontal displacement threshold.

The controller may be arranged to constantly control the at least one of the first propeller motor and the at least one steering element while a speed of the ground unit exceeds a speed threshold.

The controller may be arranged to be prevented from controlling the at least one of the first propeller motor and the at least one steering element if a horizontal displacement between the ground unit and the aerial unit is below tolerable horizontal displacement threshold and the speed of the ground unit is below the speed threshold.

The ground unit may include a positioning unit that may be arranged to image the aerial unit and to generate aerial unit metadata about the location of the aerial unit. The controller may be arranged to control at least one of the first propeller motor and the at least one steering element in response to at least the metadata and to the relationship between the aerial unit location information and the ground unit location information.

The aerial unit further may include a positioning unit arranged to image the ground unit and to generate ground unit metadata about the location of the ground unit. The controller may be arranged to control at least one of the first propeller motor and the at least one steering element in response to at least the ground unit metadata and to the relationship between the aerial unit location information and the ground unit location information.

The system may include a connecting element orientation sensor may be arranged to generate connecting element orientation metadata indicative of an orientation of the connecting element. The controller may be arranged to control at least one of the first propeller motor and the at least one steering element in response to at least one out the connecting element orientation metadata, and the relationship between the aerial unit location information and the ground unit location information.

The controller may be arranged to ignore the aerial unit location information and the ground unit location information when a distance between the ground unit and the aerial unit is below a predetermined proximity threshold.

The controller may be arranged to ignore connecting element orientation metadata when a distance between the ground unit and the aerial unit is above a predetermined proximity threshold.

The ground unit may include a proximity sensor may be arranged to determine a relationship between (a) the predetermined proximity threshold and (b) the distance between the ground unit and the aerial unit.

The connecting element may include a marker that is positioned at a location that corresponds to the predetermined proximity threshold and wherein the proximity sensor may be arranged to detect the marker.

The system may include a connecting element orientation sensor may be arranged to generate connecting element orientation metadata indicative of an orientation of the connecting element. The controller may be arranged to control at least one of the first propeller motor and the at least one steering element in response to the connecting element orientation metadata, and the relationship between the aerial unit location information and the ground unit location information.

According to an embodiment of the invention there may be provided a system that may include a ground unit; an aerial unit; and a connecting element arranged to connect the ground unit to the aerial unit. The ground unit may include a connecting element manipulator, for altering an effective length of the connecting element. The effective length of the connecting element defines a distance between the ground unit and the aerial unit; and a ground unit controller for controlling the connecting element manipulator. The aerial unit may include a first propeller; a frame; a first propeller motor that is configured to rotate the first propeller about a first axis, wherein the first propeller motor is connected to the frame, at least one steering element and a connecting element orientation sensor may be arranged to generate connecting element orientation metadata indicative of an orientation of the connecting element. At least one of the ground unit and the aerial unit may include a controller may be arranged to control, at least in response to the connecting element orientation metadata, at least one of the first propeller motor and the at least one steering element to affect at least one of the location of the aerial unit and an orientation of the aerial unit.

The controller may be arranged to determine to ignore the connecting element orientation metadata and to control the at least one of the first propeller motor and the at least one steering element based upon information provided by at least one location sensor that differs from the connecting element orientation sensor.

The controller may be arranged to determine to ignore the connecting element orientation metadata if a distance between the ground unit and the aerial unit exceeds a predetermined proximity threshold.

According to an embodiment of the invention a system is provided and may include a ground unit; an aerial unit; and a connecting element arranged to connect the ground unit to the aerial unit. The ground unit comprises a connecting element manipulator, for altering an effective length of the connecting element. The effective length of the connecting element defines a distance between the ground unit and the aerial unit; a ground unit controller for controlling the connecting element manipulator. The aerial unit may include a first propeller; a frame; a first propeller motor that is configured to rotate the first propeller about a first axis, wherein the first propeller motor is connected to the frame; at least one steering element. The system may include sensors of different types that may be arranged to provide multiple indications about a spatial relationship between the aerial unit and the ground unit; wherein sensors of different types differ from each other by a manner of operation; wherein at least one of the ground unit and the aerial unit may include a controller may be arranged to select at least one selected type of sensor of the different types; and control, in response to indications from the at least one selected type of sensor, at least one of the first propeller motor and the at least one steering element to affect at least one of the location of the aerial unit and an orientation of the aerial unit.

The controller may be arranged to select the at least one selected type of sensor based upon a distance between the aerial unit and the ground unit.

The controller may be arranged to select the at least one selected type of sensor based upon an expected reliability of the type of sensor given an estimated spatial relationship between the aerial unit and the ground unit.

The controller may be arranged to select indications from a connecting element orientation sensor and to ignore indications from triangulation based aerial unit and ground unit location sensors when a distance between the ground unit and the aerial unit is below a predetermined proximity threshold.

The controller may be arranged to ignore indications from a connecting element orientation sensor and select indications from triangulation based aerial unit and ground unit location sensors when a distance between the ground unit and the aerial unit is above a predetermined proximity threshold.

BRIEF DESCRIPTION OF THE DRAWINGS

Further features and advantages of the invention will be apparent from the description below. The invention is herein described, by way of example only, with reference to the accompanying drawings, wherein:

FIGS. 10A-10D are general views of aerial units of systems according to embodiments of the invention;

DETAILED DESCRIPTION OF THE DRAWINGS

A system is provided. The system may be used for height spreading of observation, signaling equipment, antennas, transmission relay station, anti-terrorist surveillance, and the like. The system may be a light, compact and portable and may include a ground unit and an aerial unit. The aerial unit orientation and location (displacement) may be controlled within four degrees of freedom while maintaining a built-in stability thereof. The system may be automatically and easily deployed and folded.

Various applications can use the system, for example: observation, height photographing, a reception/transmission relay, spot marking (by a projector or laser), antennas etc.

Various embodiments of systems 100-106 are illustrated in FIGS. 1-7. Systems 100, 102, 103, 104 and 105 of FIGS. 1,3,4,5 and 6 are illustrated as including a single video camera 232.

Figure 2:
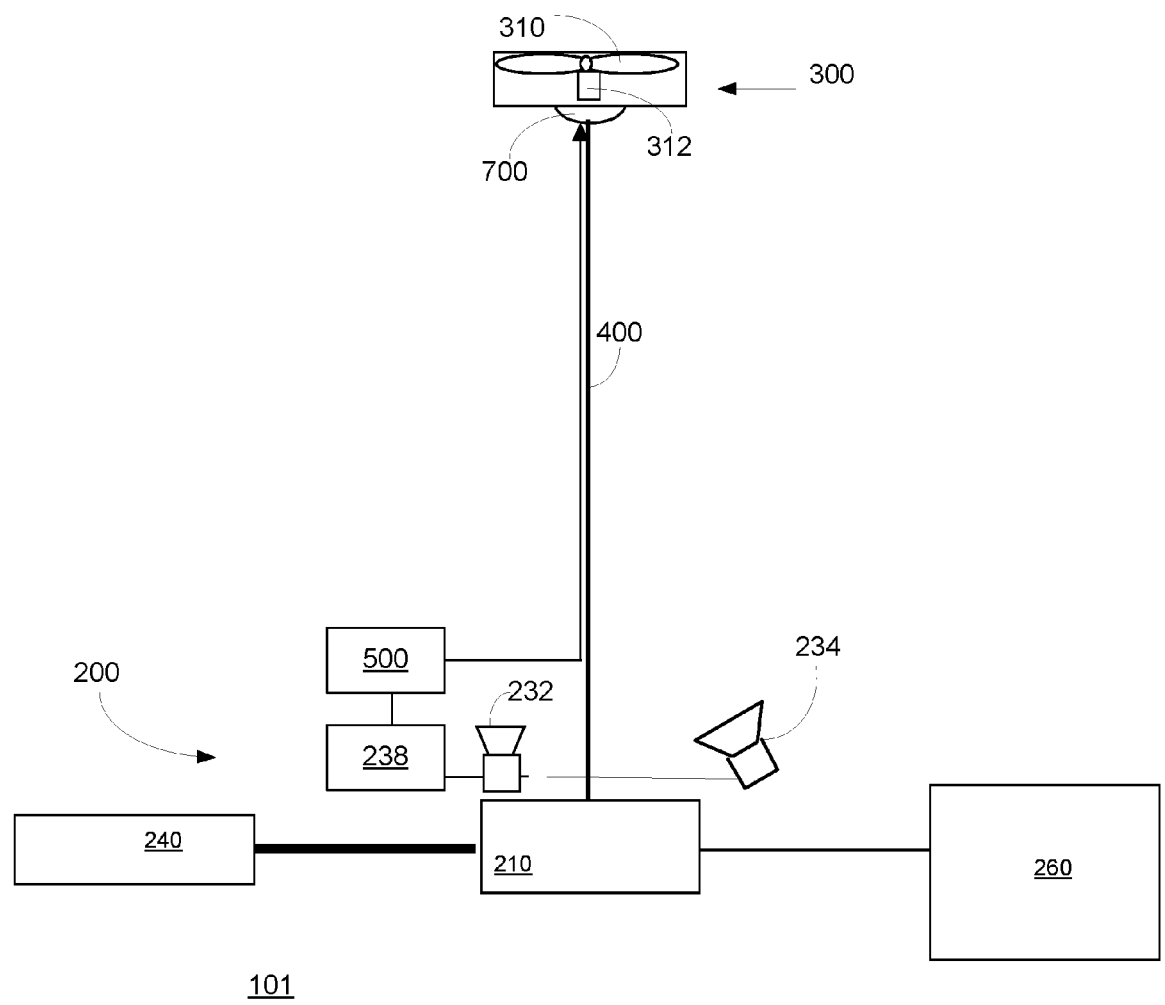
FIG. 2 is a general view of a system according to an embodiment of the invention.
Figure 7:
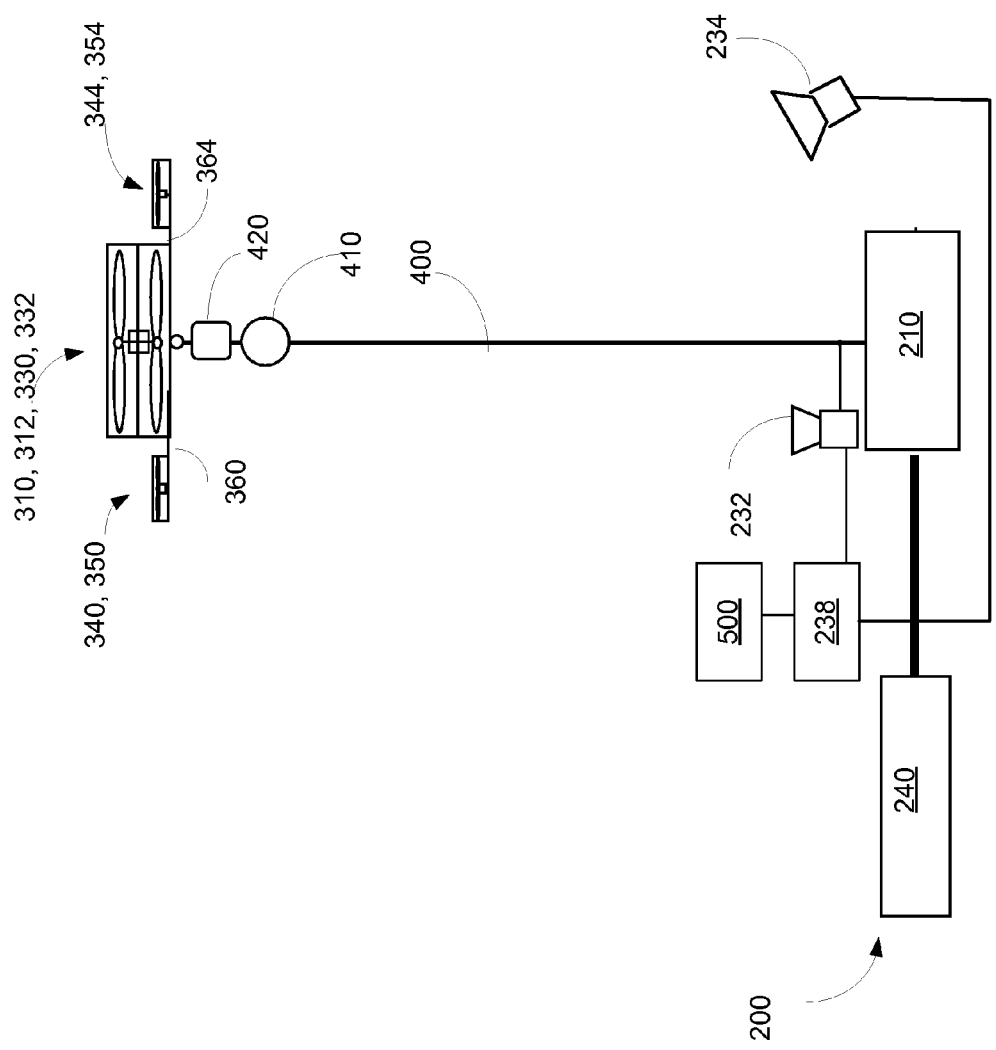
FIG. 7 is a general view of a system according to an embodiment of the invention.
Figure 8:
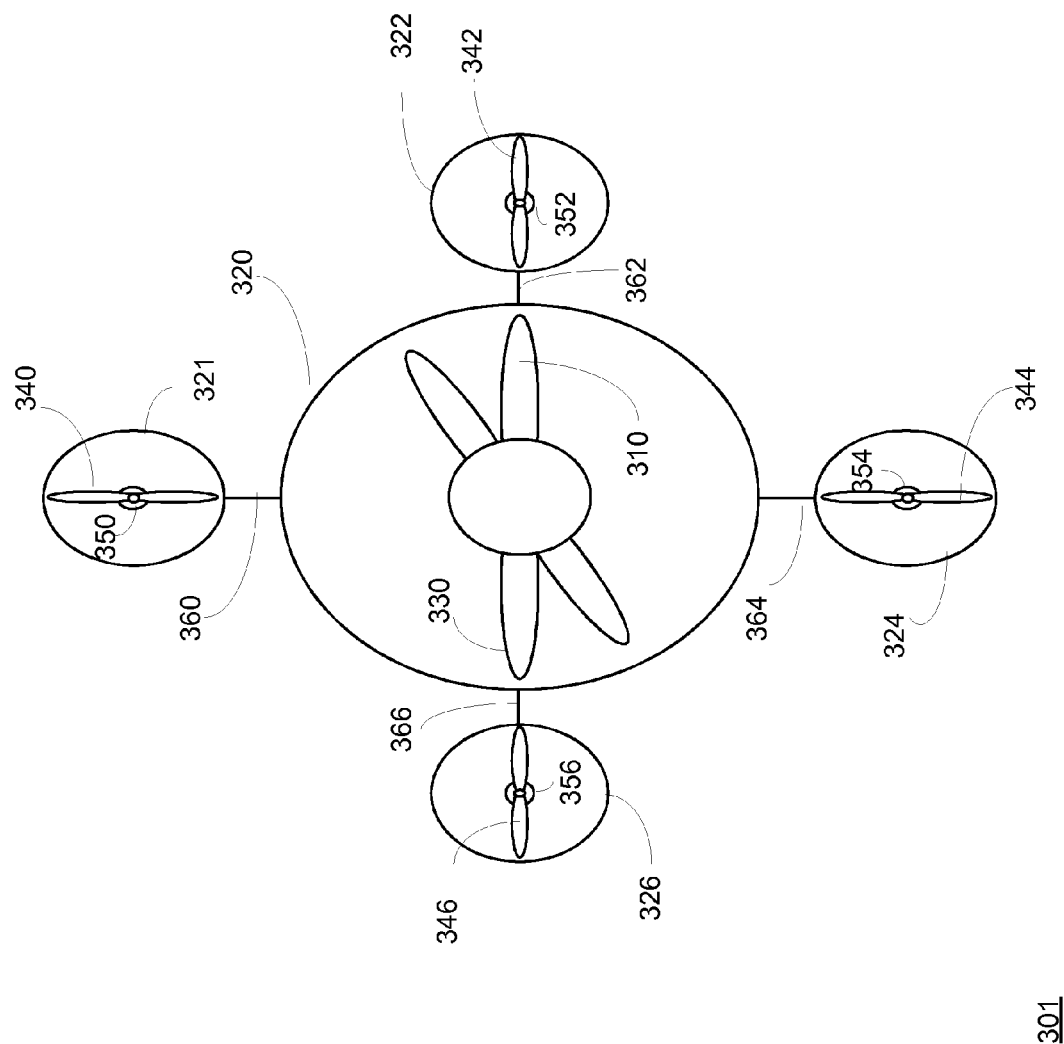
FIG. 8 is a general view of an aerial unit of a system according to an embodiment of the invention.

Systems 101 and 106 of FIGS. 2 and 7 have two video cameras 232 and 234. It is noted that each system can have more than two video cameras.

Systems 100, 101, 102 and 104 of FIGS. 1, 2, 3 and 5 are illustrated as having an aerial unit with a single propeller 310 (and also include a steering element that may be a second propeller and is not shown).

Figure 4:
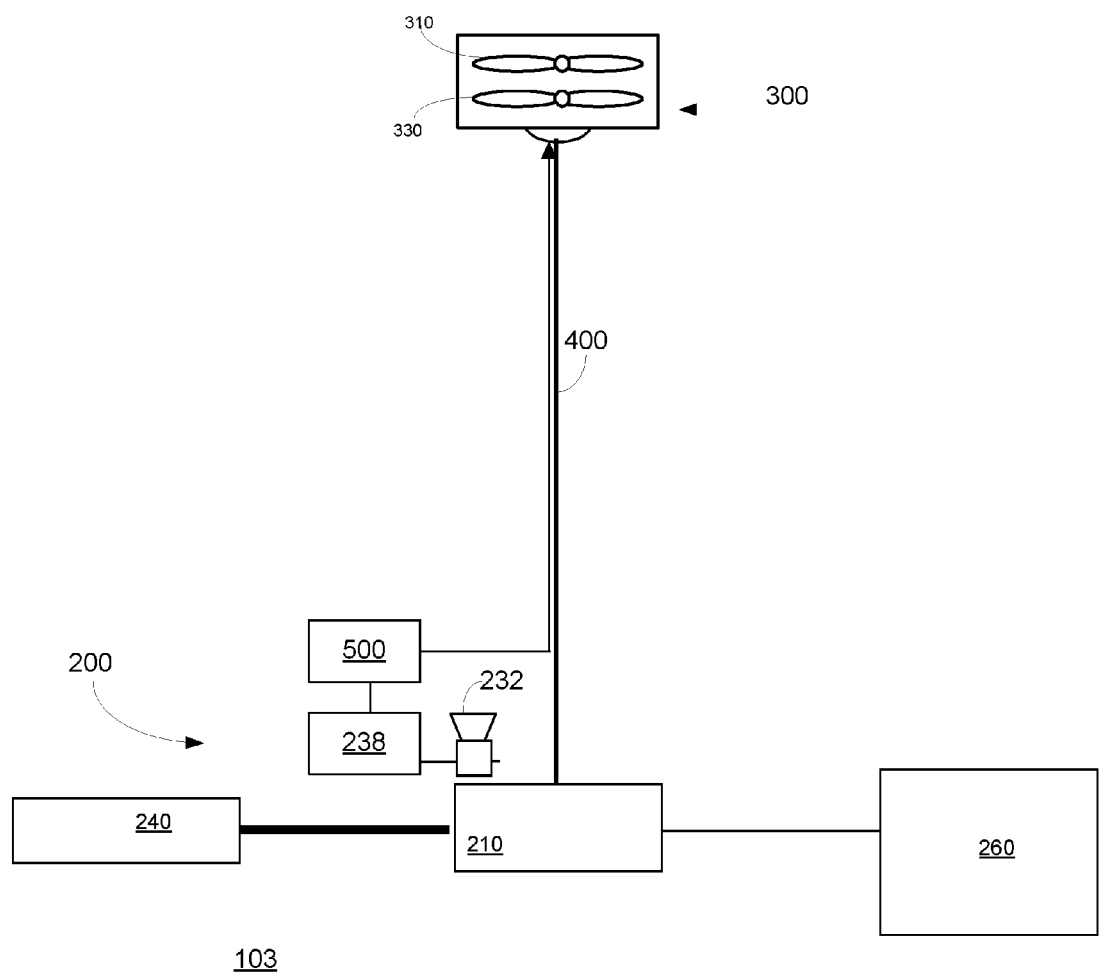
FIG. 4 is a general view of a system according to an embodiment of the invention.

System 103 of FIG. 4 has a pair of propellers 310 and 330 that rotate about concentric axes.

Figure 6:
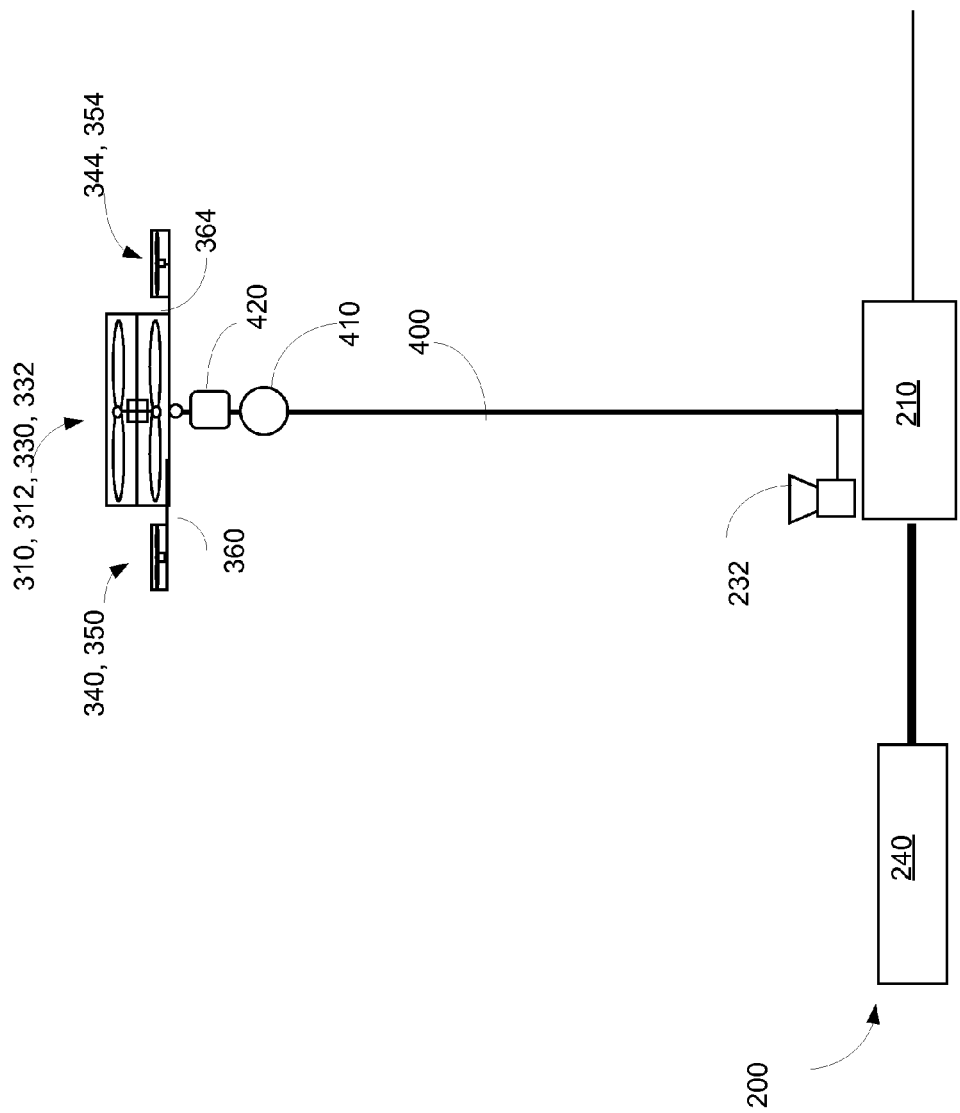
FIG. 6 is a general view of a system according to an embodiment of the invention.

Systems 105 and 106 of FIGS. 6 and 7 include a pair of "main" propellers 310 and 330 as well as additional propellers 340, 342, 344 and 346.

Figure 3:
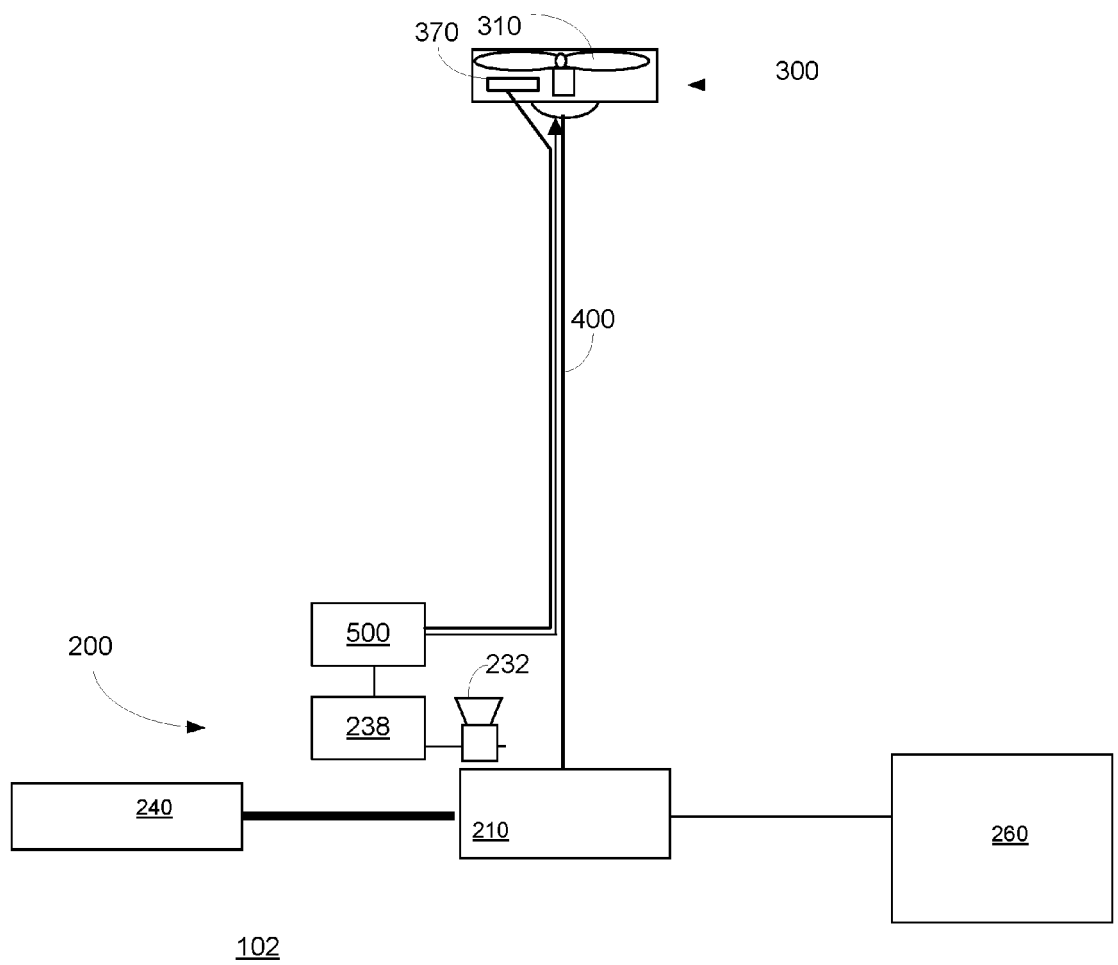
FIG. 3 is a general view of a system according to an embodiment of the invention.

System 102 of FIG. 3 is illustrates as having an aerial unit that includes an orientation sensor 370.

Figure 11:
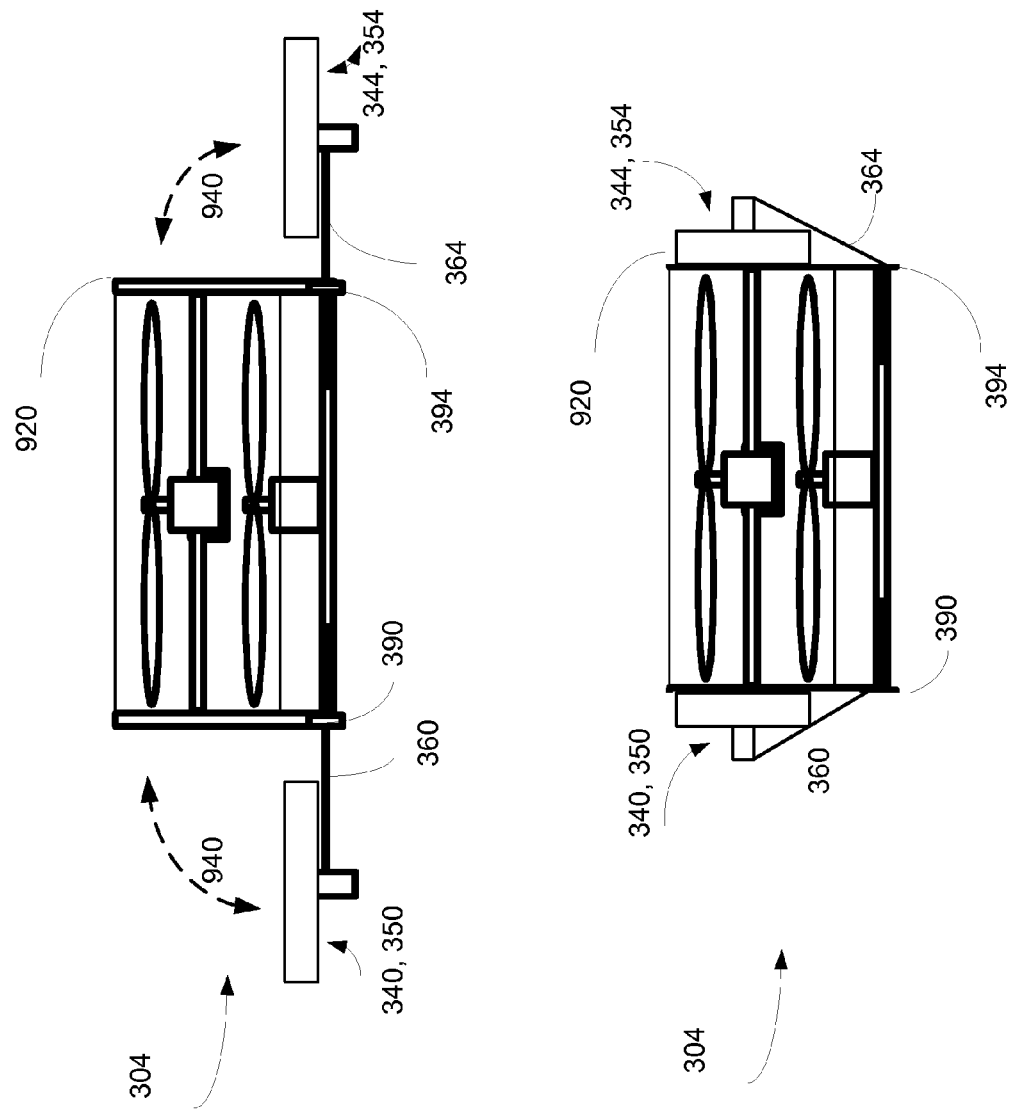
FIG. 11 is a general view of an aerial unit of a system according to an embodiment of the invention.

Aerial units 301, 302 and 304 of FIGS. 8-11 are illustrates as including a pair of propellers as well as four additional propellers. These figures illustrate different folding arrangements of the four additional propellers. FIGS. 10A-10D illustrate a rotation within an imaginary horizontal plane while FIG. 11 illustrates a rotation within a vertical plane. FIG. 10A is a top view of aerial unit 302 at an open configuration. FIG. 10B is a top view of aerial unit 302 at a closed configuration. FIG. 10C is a side view of aerial unit 302 at a closed configuration where the additional propellers (for example 322 and 326) are located below the first and second propellers 310 and 330. FIG. 10D is a side view of aerial unit 302 at a closed configuration where the additional propellers (for example 322 and 326) are located between the first and second propellers 310 and 330.

Any combination of components of each of the systems can be provided. The same applies to the aerial unit. For example, any one of systems 101-107 can be equipped with any of the aerial units 300, 302 and 304. Yet for another example, each system can include one or more video cameras, one or more orientation sensors and the like.

A system may be provided and may include a ground unit 200, an aerial unit 300, 302 and 304 and a connecting element 400 arranged to connect the ground unit 200 to the aerial unit 300, 302 and 304.

The ground unit 200 may include a connecting element manipulator 201, a base 202 and a ground unit controller 203 (collectively denoted 210).

The connecting element manipulator 201 is for altering an effective length of the connecting element 400. The effective length of the connecting element 400 defines a distance between the ground unit 200 and the aerial unit 300, 302 and 304.

The connecting element 400 can be a flexible cable that is maintained in a tensed status while the aerial unit 300, 302 and 304 is in the air.

The aerial unit 300, 302 and 304 can be arranged to maneuver in relation to the flexible cable, when the flexible cable is maintained in the tensed status.

The Flexible cable may include an electrical cable and a communication cable. These cables may be wrapped by or otherwise surrounded by flexible cable that provides a mechanical connectivity between the ground unit and the aerial unit.

The flexible cable is expected to physically tie and secure the aerial unit and electrically connect the ground unit and the aerial unit for power supply and communication. The aerial unit and the flexible cable do not require a special vehicle for support, as any van or relatively light vehicle can be adequate. Lighter versions of the system can even be carried by a person and even installed inside a backpack.

The flexible cable (once fully released) may be of 30 m length in order to get a good observation but other lengths may be used too. The average lifting and landing time of the aerial unit is around 10 seconds. The aerial unit may be configured to hold a payload of 1 to 5 kilos (although heavier or lighter payloads may be lifted by the aerial unit), may have a low heat emission and may barely generate noise. It is noted that flexible cables of other lengths may be used.

The base 202 is for receiving aerial unit and even for storing the aerial unit when the aerial unit is at its lowest position (ground position).

The ground unit controller 203 is for controlling the connecting element manipulator 201.

The ground unit 200 also includes a positioning unit 230 that is arranged to image the aerial unit and to generate metadata about a location of the aerial unit. The position unit is illustrates in FIG. 1 as including video camera 232 and an image processor 238. It may include multiple video cameras (as illustrated in FIGS. 2 and 7). The metadata can refer to the location of the aerial unit, to the orientation of the aerial unit of both. It has been found that the image processing can be simplified by having the single video camera detect the location of the aerial unit while an orientation sensor (370 of FIG. 3) can detect the orientation of the aerial unit.

According to various embodiment of the invention various aerial units 300, 302 and 304 are provided. These aerial units may differ from each other by the number of propellers (second propeller 330, additional propellers 340, 342, 344 and 346 as their propeller motors), the existence of an orientation sensor 370, the manner in which payload is connected (to the aerial unit or to the connecting element 400), manner in which the additional propellers (if exist) converge when the aerial unit is in a close position, the number, shape and size of the additional propellers and the like, the type of electronic circuitry that is included in the aerial unit—from a controller to having only control wires and power lines the convey power and instructions to the various propeller motors.

Any of the aerial units 300, 302 and 304 may include (a) a first propeller 310, (b) a frame 320, (c) a first propeller motor 312 that is configured to rotate the first propeller 310 about a first axis, wherein the first propeller motor 312 is connected to the frame 320, and (d) at least one steering element. The at least one steering element can be a second propeller 330, one or more additional propellers 340, 342, 344 and 346 or any other steering element such as movable shelves.

At least one of the ground unit 200 and the aerial unit 300, 302 and 304 may include a controller (such as controller 500) that is arranged to control, at least in response to the metadata, at least one of the first propeller motor 312 and the at least one steering element to affect at least one of the location of the aerial unit 300, 302 and 304 and the orientation of the aerial unit 300, 302 and 304.

For simplicity of explanation controller 500 is illustrated as being a part of the ground unit 200 but this is not necessarily so.

As indicated above, the positioning unit may include a single video camera (232), multiple video cameras (232, 234) and at least two optical axes of at least two video cameras are oriented in relation to each other.

Figure 1:
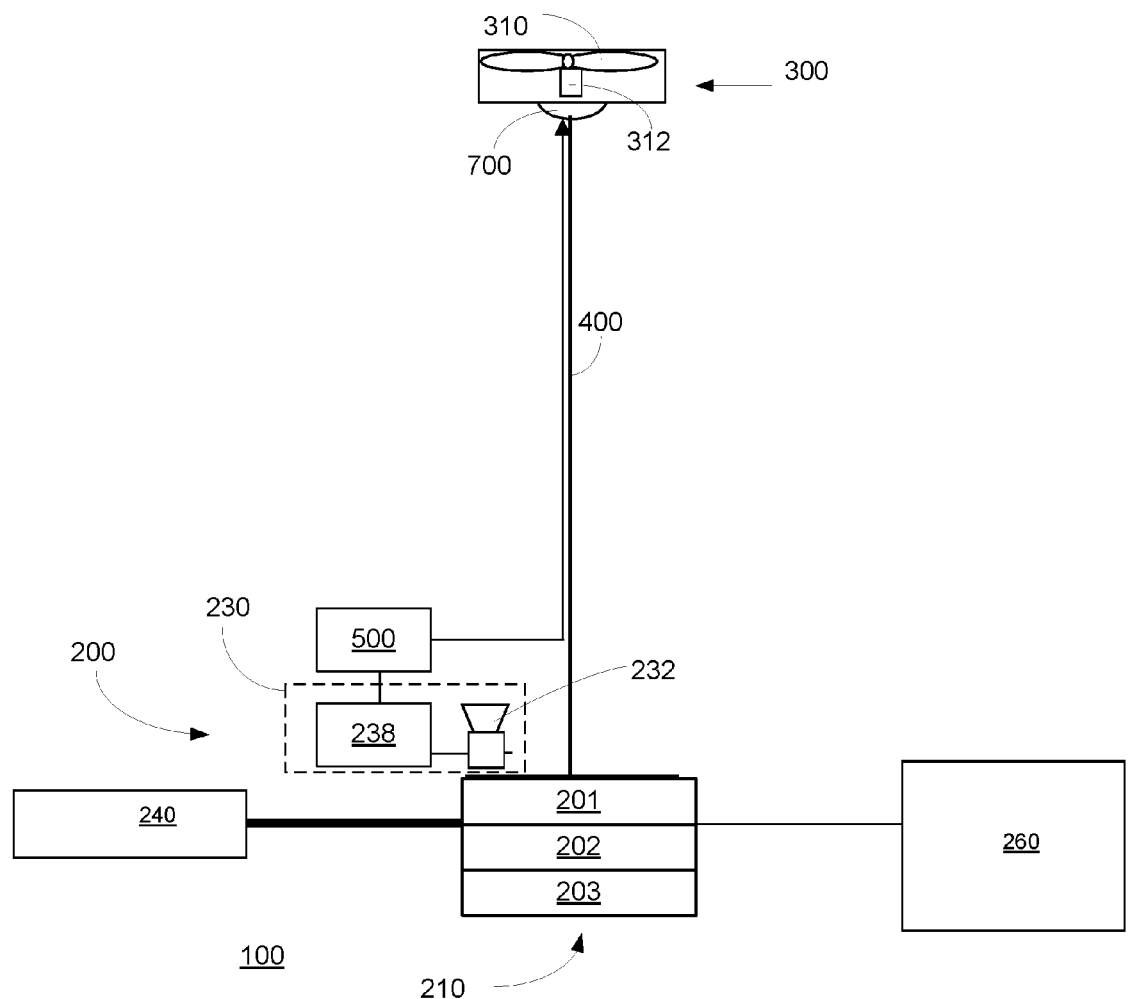
FIG. 1 is a general view of a system according to an embodiment of the invention.

The video camera 232 can be proximate to point in which the connecting element 400 is connected to the ground unit—as shown, for example, in FIG. 1.

The video camera can be remotely positioned from the connecting element manipulator 201.

The image processor 238 may be arranged to determine a location of the aerial unit in relation to a desired location, and generate location metadata indicative of position corrections that should be made to position the aerial unit at the desired location. The location metadata can include positioning commands, the desired correction to be applied in order to return the aerial unit to a desired rotation and the like.

FIG. 7 illustrates a connector 410 (such as a joint) that couples the flexible cable 400 to the aerial unit 300, 302 and 304 while allowing the aerial unit 300, 302 and 304 to move in relation to the flexible cable 400.

FIG. 7 further illustrates an interface electronic unit 420 that is positioned below the connector 410 and is arranged to send power and commands to the first motor. The interface electronic unit 420 can send commands to the various propeller motors in a format that is compliant to the formal acceptable by these various propeller motors. Placing the interface electronic unit 420 outside the aerial unit and without being supported by the aerial unit reduced the weigh of the aerial unit and makes it easier to steer and manipulate.

FIGS. 4 and 7-11 illustrates a second propeller 330 that is arranged to rotate about a second axis; wherein the first and second axes are concentric. Yaw steering of the aerial unit can be facilitated by controlling the thrust of each of the first and second propellers 310 and 330, as illustrates by arrow 930 of FIG. 9.

The frame 320 at least partially surrounds the first propeller 310.

According to an embodiment of the invention the system includes additional propellers 340, 342, 344 and 346, as well as additional propeller motors 350, 352, 354 and 356 that are arranged to rotate the additional propellers.

Each additional propeller is positioned outside the frame 320. The controller 500 mat be further arranged to control the additional propeller motors.

The additional propellers may be are arranged in a symmetrical manner around the first propeller 310.

The additional propellers 340, 342, 344 and 348 may be smaller than the first propeller 310.

The various propeller motors can be independently controlled by the controller 500. The controller 500 can independently control at least two of the propeller motors. Thus, the thrust and the direction of such motors can differ from each other.

Figure 9:
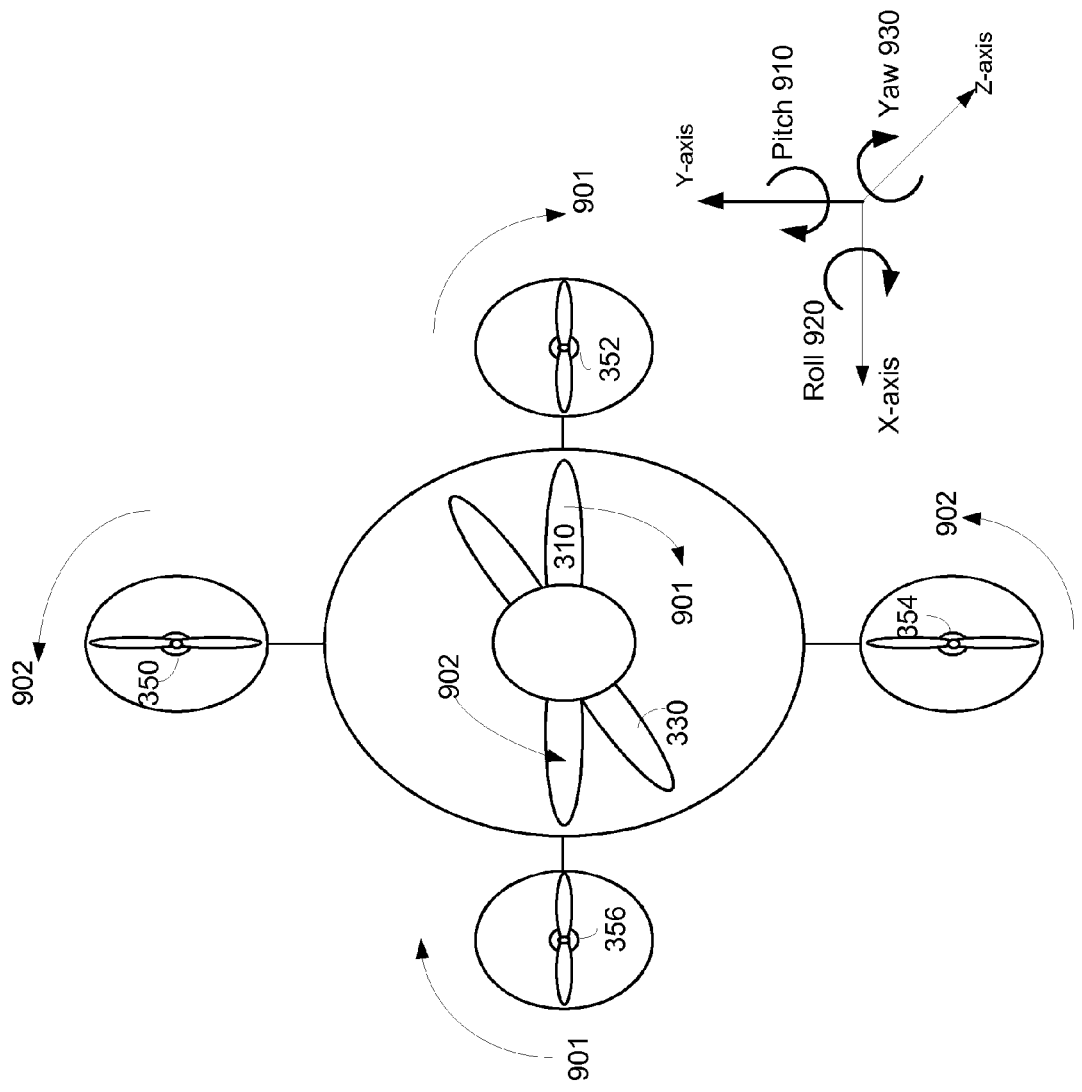
FIG. 9 is a general view of an aerial unit of a system according to an embodiment of the invention.

The controller 500 can be arranged to control one additional propeller motor to rotate in a clockwise manner and control another additional propeller motor to rotate in a counterclockwise manner. FIG. 9 illustrates three propellers that rotate clockwise (920) and three other propeller that rotate counterclockwise (901).

The controller 500 may alter at least one of a location and an orientation of the aerial unit 302, 304 by controlling a thrust of at least two propellers of a group of propellers that includes the additional propeller and the first propeller.

The controller 500 may perform yaw steering by controlling the first propeller 310 and at least one steering element (such as second propeller 330) that differs from the additional propellers.

The controller 500 may perform pitch (910) and roll (920) steering by controlling at least two additional propellers.

The controller 500 may be arranged to control (by sending control signals) a change of at least one of a location and orientation of the aerial unit by altering at least one thrust of at least one propeller of the group while maintaining directions of rotation of the propellers of the group unchanged. An example is provided in FIG. 9- the direction of rotation remains unchanged. The following table illustrates a relationship between thrust differences and their meaning.

| | |
|---|---|
| Difference between thrust of first and second propellers 310 and 330 | Yaw steering (rotation about z-axis) |
| Difference between thrust of first and third additional propellers 340 and 344 | Roll steering (rotation about x-axis) |
| Difference between thrust of second and fourth additional propellers 342 and 346 | Pitch steering (rotation about y-axis) |

For example, referring to the example set forth in FIG. 9, allowing the first propeller 310 to develop more thrust than the second propeller 330 will cause the aerial unit to rotate clockwise. Allowing the first additional propeller 340 to develop more thrust than the third additional propeller 330 will cause the aerial unit to rotate within an imaginary Y-Z plane, wherein the rotation starts by lowering the third additional propeller 330 while elevating the first additional propeller.

Figure 5:
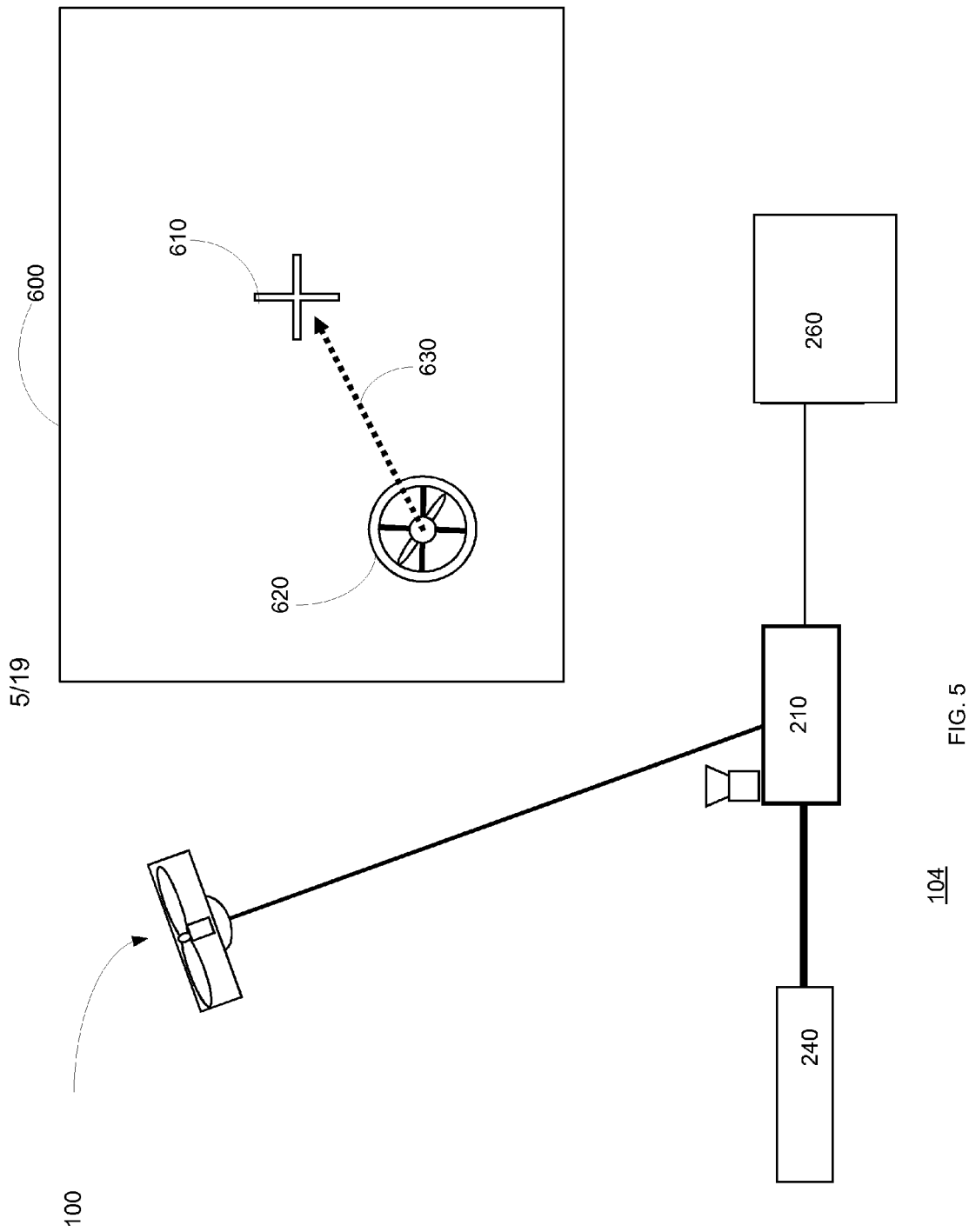
FIG. 5 is a general view of a system and of a field of view of a video camera according to an embodiment of the invention.

Various types of steering can be applied in order to set the aerial unit at a desired location, a desired orientation or both. If, for example, the wind causes the aerial unit to drift to a certain location the steering can be applied to counter that drift. FIG. 5 illustrates a field of view 600 of video camera 232, a current location 620 of the aerial unit, a desired location 610 of the aerial unit and a vector 630 that represents the desired location correction action.

Yet for another example, the steering can be applied in order to allow the aerial unit to fulfill a predefined flight pattern such as a scan pattern in which the aerial unit is directed along a scan patters thus allowing its payload to change its field of view according to a desired pattern.

The additional propeller motors 350, 352, 354 and 356 and the additional propellers 340, 342, 344 and 346 may be positioned outside the frame 320. The additional propeller motors 350, 352, 354 and 356 may be connected to additional frames 360, 362, 364 and 366. The additional frames 321, 322, 324 and 326 can be are coupled to the frame 320 by coupling elements 360, 362, 364 and 366 that allow movement between the frame 320 and the additional frames.

This movement is required to facilitate the aerial unit to move between an open configuration (FIG. 9, left side of FIG. 10 and upper portion of FIG. 11) to a close configuration (right side of FIG. 10 and lower portion of FIG. 11). The coupling elements can be rods, arms, or any structural element that facilitates such movement.

When the additional frames are in an open condition the additional frames 321, 322, 324 and 326 and the frame 320 do not overlap and when the additional frames 321, 322, 324 and 326 are in a close condition the additional frames 321, 322, 324 and 326 and the frame 320 overlap.

The additional frames can change their position from a horizontal position to a vertical position—when moving from an open position to a closed position—as illustrated in FIG. 11, and especially by dashed arrows 940.

Additionally or alternatively, the movement from a closed position to an open position can take place in a horizontal plane- as illustrated by dashed arrows 930 of FIG. 10.

The aerial unit can be in a closed position when proximate to the ground unit (at the beginning of the elevation process and at the end of the landing process). This can be done by activating motors that change the spatial relationship between the frame and the additional frames or by deactivating the additional propellers at the appropriate time.

Various figures such as FIGS. 1-5, illustrate the ground unit 200 as including a power source 240 and a user interface 260 that can allow a user to affect the control scheme—for example by determining the desired location. The user interface 260 may include a joystick (or other man machine interface) for receiving positioning commands and, additionally or alternatively, for displaying the location of the aerial unit in relation to the desired location.

The power provided to the aerial unit can also be utilized for powering the payload 700.

The ground unit 200 may be positioned on a vehicle such as a van and aerial unit that holds a payload (such as one or more types of equipment) and can lift itself to heights of about thirty meters within approximately ten seconds. It is noted that the aerial unit can lift the equipment to heights that differ from thirty meters and during a period that differs than ten seconds.

The system does not require a physical support for the aerial unit that performs the observation from the heights, since the aerial unit supports itself. Thus—the flexible cable can be light weighted since it doesn't need to support aerial unit.

Figure 12:
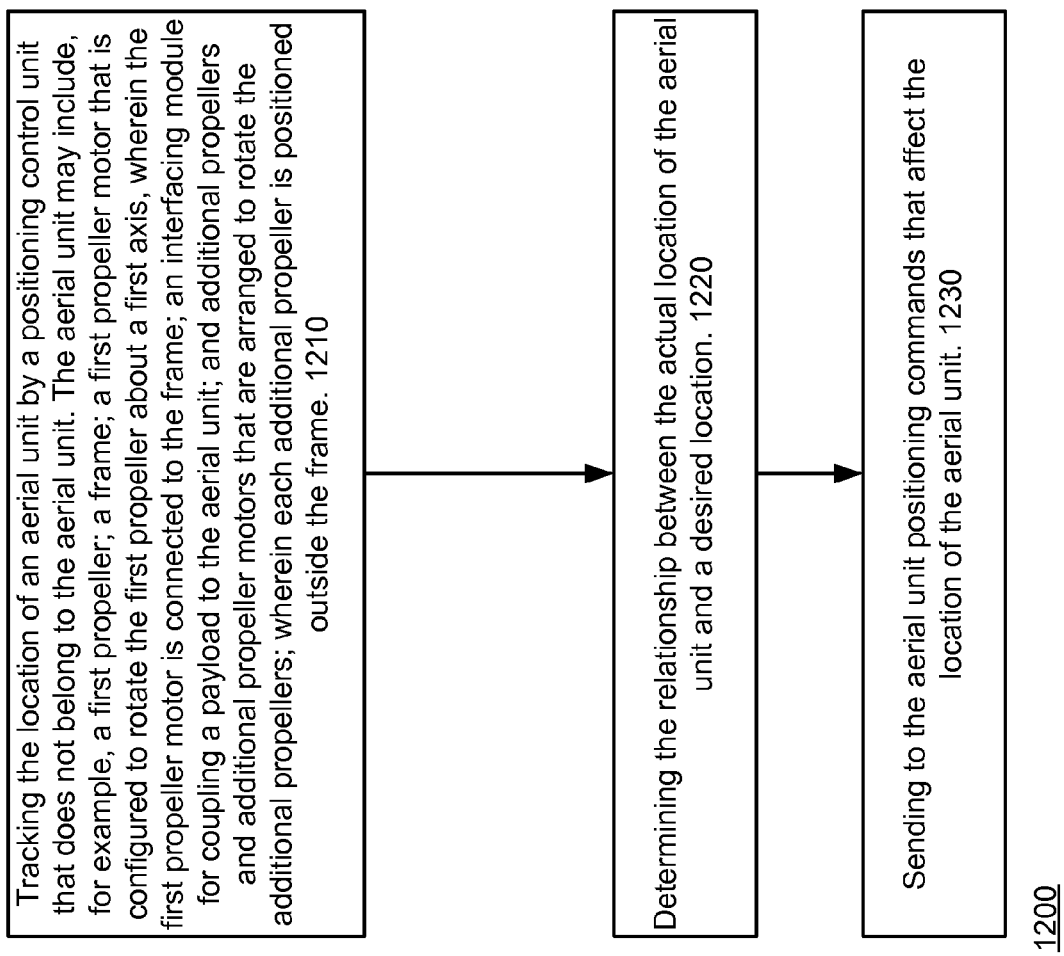
FIG. 12 is a flow chart of a method according to an embodiment of the invention.

FIG. 12 illustrates method 1200 according to an embodiment of the invention.

Method 1200 may start by stage 1210 of tracking the location of an aerial unit by a positioning control unit that does not belong to the aerial unit.

Stage 1210 may be followed by stage 1220 of determining the relationship between the actual location of the aerial unit and a desired location.

Stage 1220 may be followed by stage 1230 of sending to the aerial unit positioning commands that affect the location of the aerial unit. The aerial unit may belong to a system as illustrated above. It may include, for example, a first propeller; a frame; a first propeller motor that is configured to rotate the first propeller about a first axis, wherein the first propeller motor is connected to the frame; an interfacing module for coupling a payload to the aerial unit; and additional propellers and additional propeller motors that are arranged to rotate the additional propellers; wherein each additional propeller is positioned outside the frame.

Figure 13:
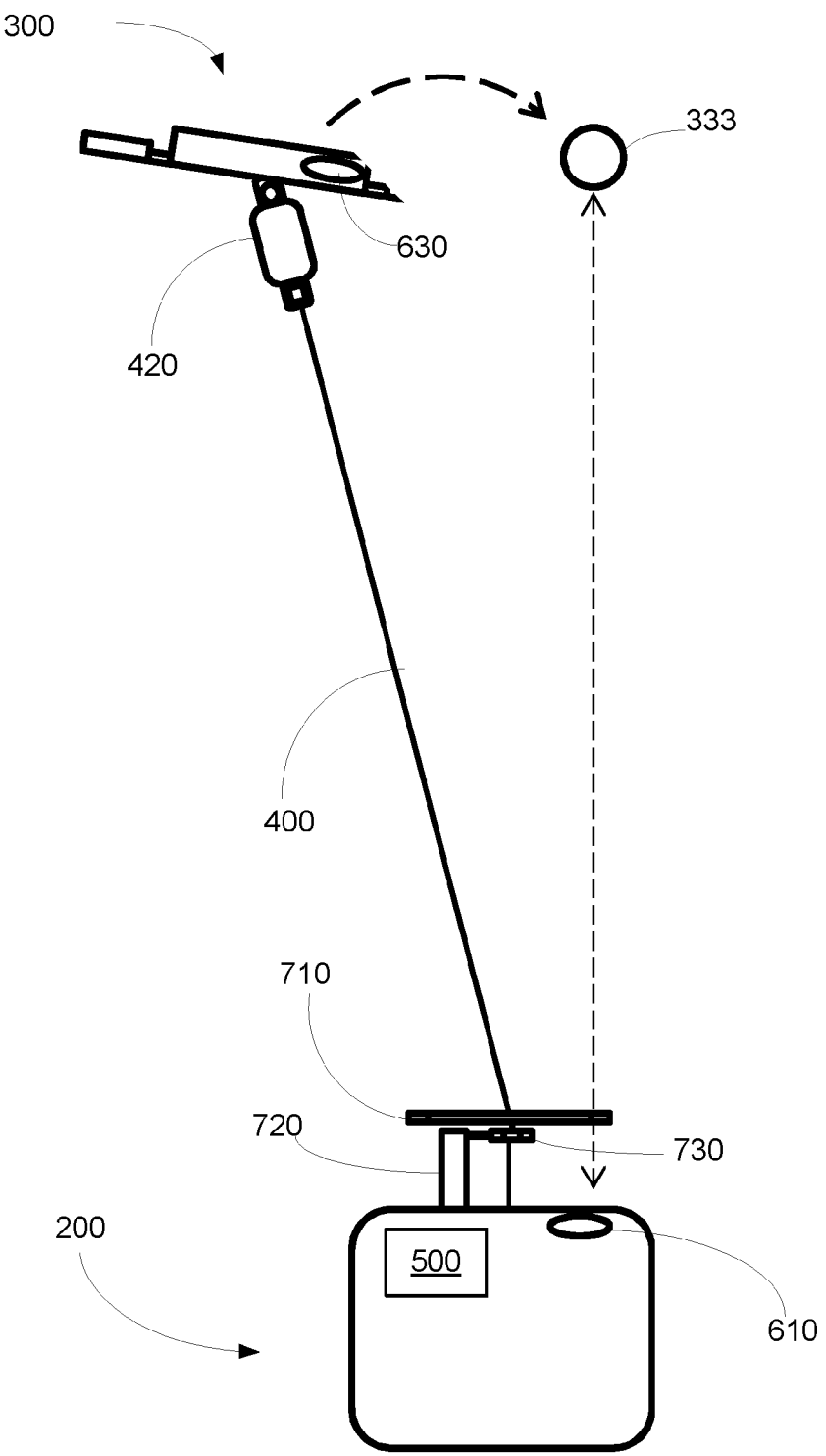
FIG. 13 illustrates a system according to an embodiment of the invention.

FIG. 13 illustrates a system 108 according to an embodiment of the invention.

The system 108 includes ground unit 200, aerial unit 300 and connecting element 400 that is arranged to connect the ground unit 200 to the aerial unit 300.

System 108 may differ from any system illustrated in the previous figures by having a ground unit location sensor 610 that arranged to generate ground unit location information indicative of a location of the ground unit 200 and having an aerial unit location sensor 630 that is arranged to generate aerial unit location information indicative of a location of the aerial unit 300.

FIG. 13 also shows a desired location 333 of the aerial unit 300—exactly above the ground unit 200. The controller 500 may aim to place the aerial unit 300 at that location.

The ground unit 200 is shown as including a landing platform 710, a height change module 720 and a cable centering ring 730. The aerial platform 300 is arranged to land on and be supported by the landing platform 710. The connecting element 400 is arranged to pass through the cable centering ring 730 that is positioned at the center of an aperture formed by the landing platform 710. The height change module 720 is arranged to allow a movement of the landing platform 710 from an upmost position (in which the landing platform 710 first contacts the aerial unit 300 during a landing process) to a lowest position (that represents the end of the landing process).

The aerial unit location sensor 610 and the ground unit location sensor 630 can be triangulation based location sensors, satellite information based location sensors such as but not limited to global positioning system (GPS) location sensors.

The ground unit location information and the aerial unit location information can be sent to a controller (such as controller 500). The controller can belong to the aerial unit 300 or to the ground unit 200 or can be distributed between the aerial unit 300 and the ground unit 200.

The controller 500 may be arranged to control, at least in response to a relationship between the aerial unit location information and the ground unit location information, at least one of a first propeller motor of the aerial unit and the at least one steering element of the aerial unit to affect at least one of the location of the aerial unit 300 and an orientation of the aerial unit 300. The controlling may include sending commands that will result in the change of speed and/or orientation of the aerial unit 300.

The controller 500 can, additionally or alternatively control other motors of the aerial unit- such as those motors that control any one of propellers denoted 330, 350, 352, 354 and 356 in FIG. 9 of the aerial unit.

According to an embodiment of the invention the ground unit location sensor 610 and the aerial unit location sensor 630 can be provided in addition to one or more other sensors and/or positioning units—such as the camera 232 of FIGS. 1-7 and 14 and even camera 234 of FIGS. 2 and 7.

Figure 14:
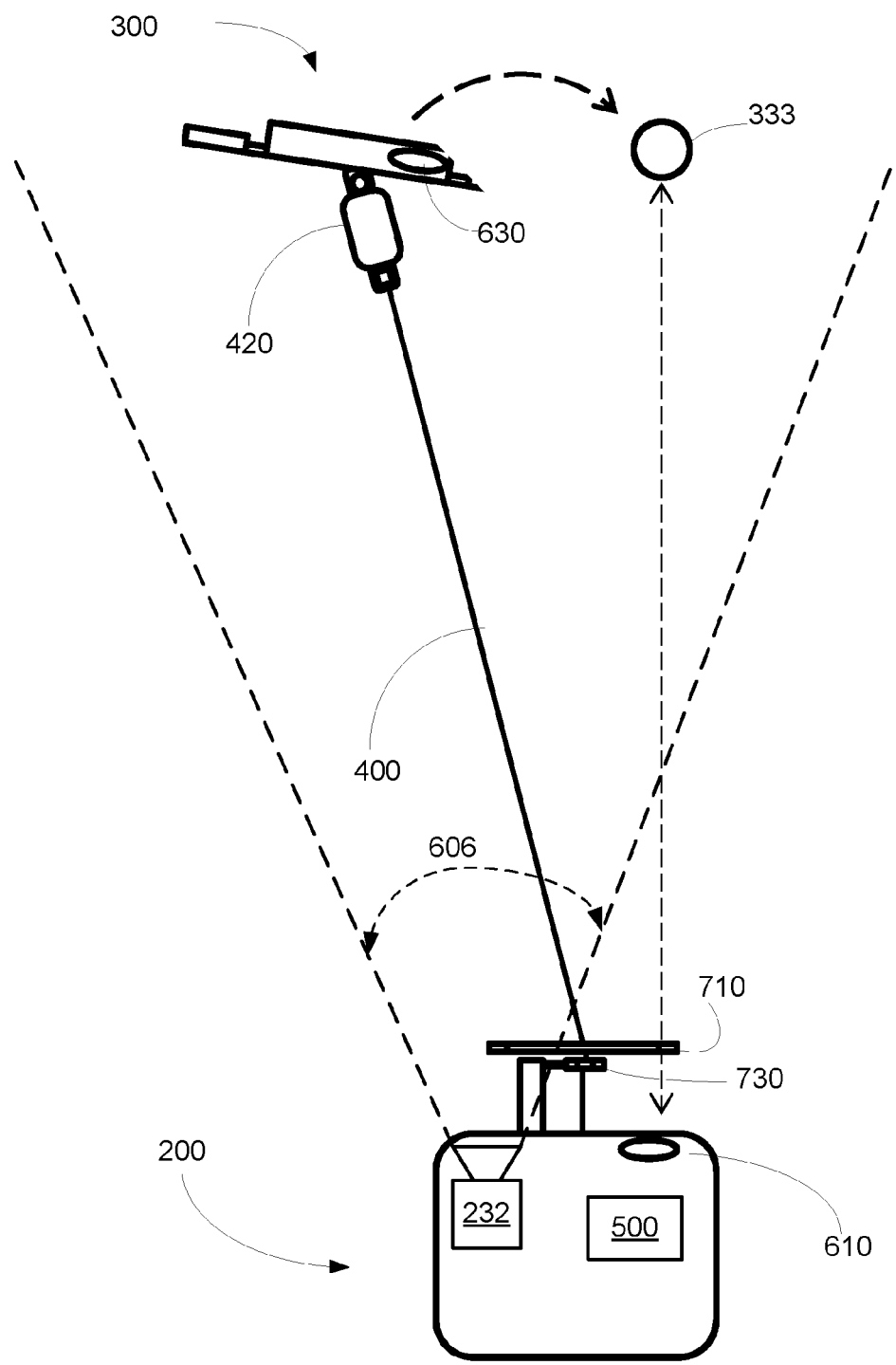
FIG. 14 illustrates a system according to an embodiment of the invention.

FIG. 14 illustrates system 109 according to an embodiment of the invention. System 109 has a ground unit location sensor 610, aerial unit location sensor 630 and camera 232 and further illustrates the field of view 606 of the camera 232.

Figure 15:
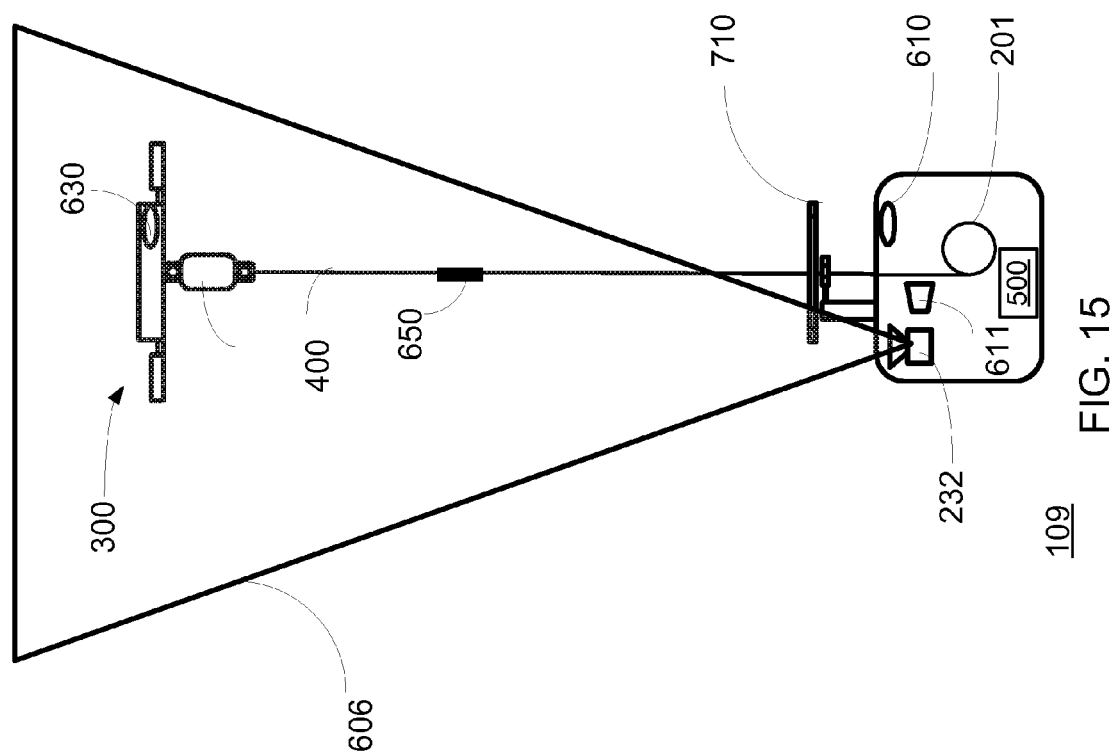
FIG. 15 illustrates a system according to an embodiment of the invention.

FIG. 15 illustrates system 110 according to an embodiment of the invention. System 110 as further including proximity sensor 610 and connecting element orientation sensor 640.

The proximity sensor 611 may be is arranged to determine a relationship between (a) the predetermined proximity threshold and (b) the distance between the ground unit 200 and the aerial unit 300. It (611) may image the connecting element 400 and search for a marker 650 that is positioned at a location that corresponds to the predetermined proximity threshold and wherein the proximity sensor is arranged to detect the marker. For example—that marker may be positioned quire close (for example—1-3 meters) from the upper end of connecting element 400.

The detection of the marker 650 during a landing process indicates that aerial unit 300 is very close to the ground unit 200—and that the predetermined proximity threshold equals the distance between these units. As the ground unit 300 continues to fold the collecting element 400 the distance decreases below the predetermined proximity threshold.

The connecting element orientation sensor 640 can sense the orientation of the connecting element 400 and thus the orientation of the aerial unit 630. It can be any known orientation sensor. For example- it can include a gyroscope.

Figure 16:
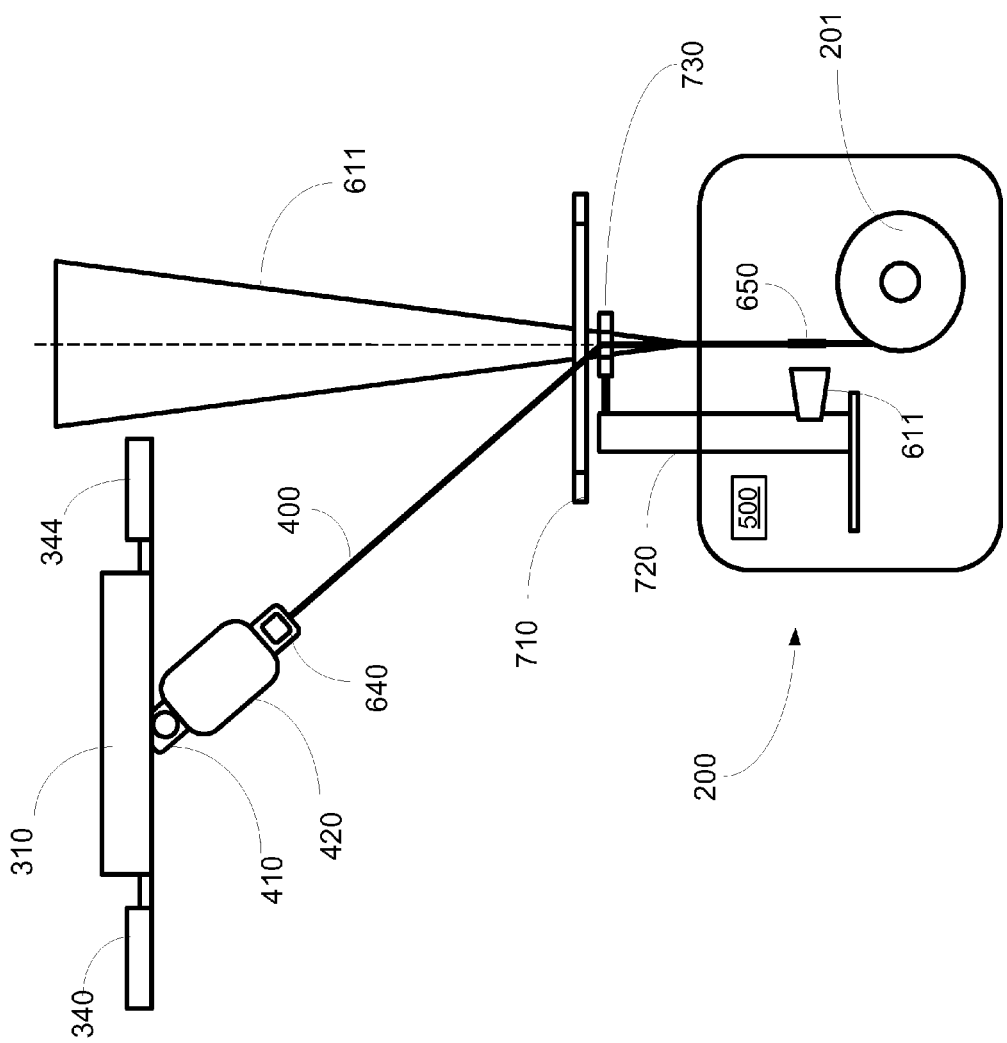
FIG. 16 illustrates a system according to an embodiment of the invention.

FIG. 16 illustrates system 110 according to an embodiment of the invention.

FIG. 16 illustrates the aerial unit 300 as being proximate to the ground unit 200—during final stages of the landing process. The proximity can be few percent (for example—below 4%) of the total length of the connecting element 400, may be few meters (for example—about 1-2 meters) and the like.

FIG. 16 also illustrates joint 410 that is arranged to connect the payload 420 or the connecting element 400 to the frame of the aerial unit 300. FIG. 16 also illustrates a connecting element manipulator 201 and further illustrates a desired angular range 611 in which the orientation of the connecting element should be during landing—and the controller 500 tries to aimed the aerial unit 300 to be located within this desired angular range (that may be about 10-30 angle wide.

It has been found that when the aerial unit 300 is proximate to the ground unit 200 navigation that is based upon the orientation of the connecting element 400 is very effective.

The connecting element 400 is strained so that it can be assumed that the orientation is kept substantially the same throughout the connecting element 400 and thus can be accurately measured in any location along the connecting element 400—including in proximity to the payload 420.

The controller 500 will try to change the orientation of the connecting element such as to be substantially vertical—or within a relatively small angular range 604. The small angular range can allow predefined deviations from normal- for example may allow the orientation of the connecting element to range between 85 and 95 degrees in relation to the horizon. Other angular ranges are possible.

When the ground unit 200 and the aerial unit 300 are proximate to each other the aerial unit may at least partially shield the ground unit positioning sensor 620 or otherwise interfere with the operation of the ground unit positioning unit 620. Additionally or alternatively, the aerial unit may be outside the field of view of camera 232.

The camera 232, ground and aerial unit location sensors 610 and 630 and the connecting element orientation sensor 640 can be regarded as belonging to three distinct types of sensors. These different types of sensors can provide multiple indications about a spatial relationship between the aerial unit and the ground unit.

The controller 500 may be arranged to select at least one selected type of sensor of the different types; and control, in response to indications from the at least one selected type of sensor, at least one of the first propeller motor and the at least one steering element to affect at least one of the location of the aerial unit and an orientation of the aerial unit.

The controller 500 may be arranged to calculate the desired location of the aerial unit based upon the current location and speeds of the ground and aerial units. For example, if the ground unit is moving then the aerial unit should be located at a desired location that will be substantially above (within an allowed vertical displacement) the ground unit—while taking into account the propagation of the ground unit.

The controller 500 may be arranged to:
 i. Select the at least one selected type of sensor based upon a distance between the aerial unit and the ground unit.
 ii. Select the at least one selected type of sensor based upon an expected reliability of the type of sensor given an estimated spatial relationship between the aerial unit and the ground unit.
 iii. Select indications from a connecting element orientation sensor and to ignore indications from triangulation based aerial unit and ground unit location sensors when a distance between the ground unit and the aerial unit is below a predetermined proximity threshold.
 iv. Ignore indications from a connecting element orientation sensor and select indications from triangulation based aerial unit and ground unit location sensors when a distance between the ground unit and the aerial unit is above a predetermined proximity threshold.

Regardless of the control scheme that is being applied by controller 500, the controller 500 can calculate the speed of the ground unit based upon changes in values of the ground unit location information. Additionally or alternatively, the controller 500 can calculate the speed of the aerial unit based upon changes in values of the aerial unit location information.

According to an embodiment of the invention the controller can apply one control scheme when the ground unit is static (or propagates at a low speed—below a speed threshold) and another control scheme when the ground unit propagates at a speed that exceeds the speed threshold. The speed threshold can be few meters per second. For example-it can be about 1.5 meters per second. The first control scheme can be continuous of non-continuous while the other control scheme should be continuous—and it allows the aerial unit to track after the expected location of the ground unit.

According to various embodiments of the invention the controller 500 may be arranged to apply one or more control schemes:
 i. Control the at least one of the first propeller motor and the at least one steering element in order to reduce the horizontal displacement between the ground unit and the aerial unit below a predetermined horizontal displacement threshold.
 ii. Change the at least one of the location and orientation of the aerial unit only if a horizontal displacement between the ground unit and the aerial unit exceeds a tolerable horizontal displacement threshold. This control scheme is also referred to as a non-continuous control scheme.
 iii. Constantly control the at least one of the first propeller motor and the at least one steering element while a speed of the ground unit exceeds a speed threshold.
 iv. Be prevented from controlling the at least one of the first propeller motor and the at least one steering element if a horizontal displacement between the ground unit and the aerial unit is below tolerable horizontal displacement threshold and the speed of the ground unit is below the speed threshold.
 v. Apply different control schemes that are selected based upon the speed of the ground unit.
 vi. Control at least one of the first propeller motor and the at least one steering element in response to at least aerial unit metadata provided by a positioning unit that is arranged to image the aerial unit. The metadata is indicative of a location of the aerial unit.
 vii. Control at least one of the first propeller motor and the at least one steering element in response to at least ground unit metadata provided by a positioning unit of the aerial unit that is arranged to image the ground unit. The metadata is indicative of a location of the ground unit.
 viii. Ignore the aerial unit location information and the ground unit location information when a distance between the ground unit and the aerial unit is below a predetermined proximity threshold.

ix. Ignore connecting element orientation metadata when a distance between the ground unit and the aerial unit is above a predetermined proximity threshold.

x. Control at least one of the first propeller motor and the at least one steering element in response to connecting element orientation metadata, and the relationship between the aerial unit location information and the ground unit location information.

xi. Ignore the connecting element orientation metadata and control the at least one of the first propeller motor and the at least one steering element based upon information provided by at least one location sensor that differs from the connecting element orientation sensor.

xii. Determine to ignore the connecting element orientation metadata if a distance between the ground unit and the aerial unit exceeds a predetermined proximity threshold.

xiii. Determine to affect at least one of the location and orientation of the aerial unit in response to the speed of the ground unit.

xiv. Calculate, based upon changes in values of the aerial unit location information, a speed of the aerial unit.

xv. Calculate required speed and orientation of the aerial unit required to reduce the horizontal displacement between the ground unit and the aerial unit below a predetermined horizontal displacement threshold. And to control the aerial unit accordingly.

xvi. Constantly control the at least one of the first propeller motor and the at least one steering element while a speed of the ground unit exceeds a speed threshold.

xvii. Be prevented from controlling the at least one of the first propeller motor and the at least one steering element if a horizontal displacement between the ground unit and the aerial unit is below tolerable horizontal displacement threshold and the speed of the ground unit is below the speed threshold.

xviii. Apply one control scheme when the ground unit is static (or propagates at a low speed—below a speed threshold) and another control scheme when the ground unit propagates at a speed that exceeds the speed threshold. The speed threshold can be few meters per second. For example- it can be about 1.5 meters per second.

Figure 17:
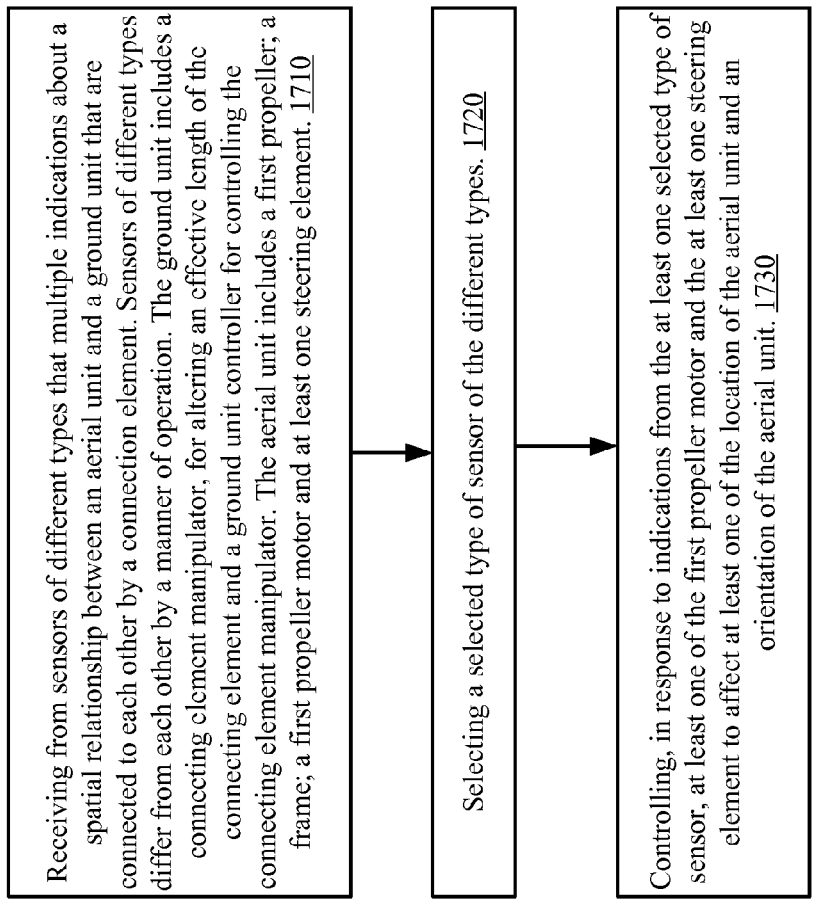
FIG. 17 is a flow chart of a method according to an embodiment of the invention.

FIG. 17 illustrates method 1700 according to an embodiment of the invention.

Method 1700 starts by stage 1710 of receiving from sensors of different types that multiple indications about a spatial relationship between an aerial unit and a ground unit that are connected to each other by a connecting element . Sensors of different types differ from each other by a manner of operation. The ground unit includes a connecting element manipulator, for altering an effective length of the connecting element and a ground unit controller for controlling the connecting element manipulator. The aerial unit includes a first propeller; a frame; a first propeller motor and at least one steering element.

Stage 1710 is followed by stage 1720 of selecting a selected type of sensor of the different types.

Stage 1720 may include selecting the at least one selected type of sensor based upon a distance between the aerial unit and the ground unit.

Stage 1720 may include selecting the at least one selected type of sensor based upon an expected reliability of the type of sensor given an estimated spatial relationship between the aerial unit and the ground unit.

Stage 1720 may include selecting indications from a connecting element orientation sensor and to ignore indications from triangulation based aerial unit and ground unit location sensors when a distance between the ground unit and the aerial unit is below a predetermined proximity threshold.

Stage 1720 may include ignoring indications from a connecting element orientation sensor and selecting indications from triangulation based aerial unit and ground unit location sensors when a distance between the ground unit and the aerial unit is above a predetermined proximity threshold.

Stage 1720 is followed by stage 1730 of controlling, in response to indications from the at least one selected type of sensor, at least one of the first propeller motor and the at least one steering element to affect at least one of the location of the aerial unit and an orientation of the aerial unit.

Figure 18:
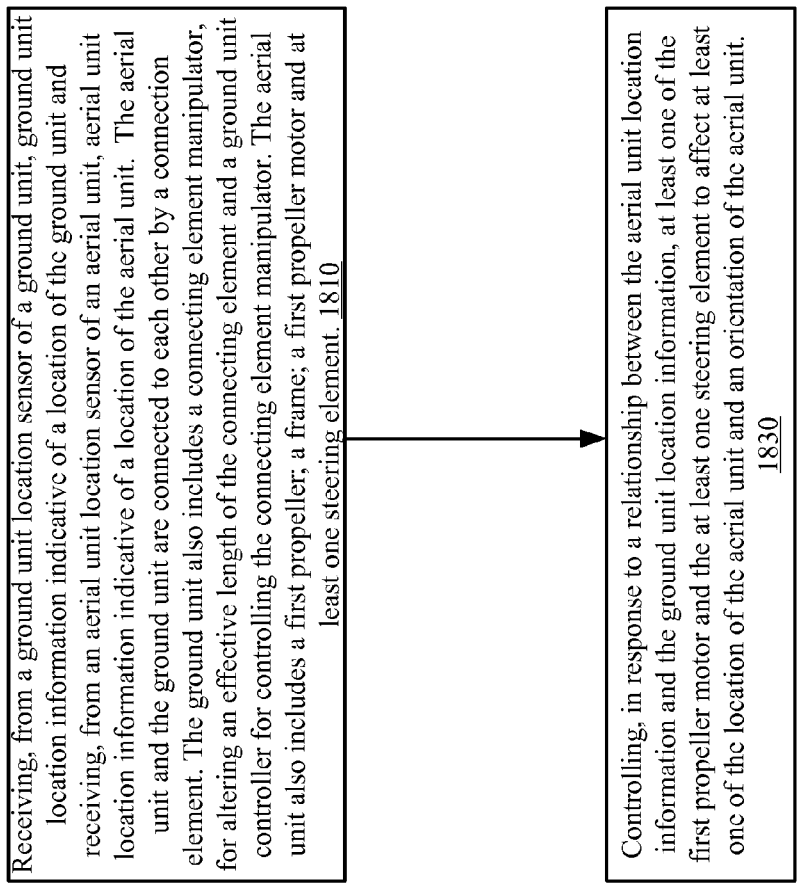
FIG. 18 is a flow chart of a method according to an embodiment of the invention.

FIG. 18 illustrates method 1800 according to an embodiment of the invention.

Method 1800 starts by stage 1810 of receiving, from a ground unit location sensor of a ground unit, ground unit location information indicative of a location of the ground unit and receiving, from an aerial unit location sensor of an aerial unit, aerial unit location information indicative of a location of the aerial unit. The aerial unit and the ground unit are connected to each other by a connecting element . The ground unit also includes a connecting element manipulator, for altering an effective length of the connecting element and a ground unit controller for controlling the connecting element manipulator. The aerial unit also includes a first propeller; a frame; a first propeller motor and at least one steering element.

The ground unit and aerial unit location sensors may be global positioning system (GPS) compliant sensors, may calculate locations based upon satellite signals, may perform triangulations for determining their locations and the like.

Stage 1810 may also include at least one of the following:
i. Receiving from a positioning unit of the ground unit that images the aerial unit, aerial unit metadata about the location of the aerial unit.
ii. Receiving from a positioning unit of the aerial unit that images the ground unit, ground unit metadata about the location of the ground unit.
iii. Receiving from a connecting element orientation sensor connecting element orientation metadata indicative of an orientation of the connecting element.
iv. Receive from a proximity sensor information about a relationship between (a) a predetermined proximity threshold and (b) the distance between the ground unit and the aerial unit.

The system according to claim the connecting element comprises a marker that is positioned at a location that corresponds to the predetermined proximity threshold and the proximity sensor is detect the marker.

Stage 1810 is followed by stage 1830 of controlling, in response to a relationship between the aerial unit location information and the ground unit location information, at least one of the first propeller motor and the at least one steering element to affect at least one of the location of the aerial unit and an orientation of the aerial unit.

Stage 1830 may include at least one of the following:
i. Controlling the at least one of the first propeller motor and the at least one steering element in order to reduce the horizontal displacement between the ground unit and the aerial unit below a predetermined horizontal displacement threshold.
ii. Changing the at least one of the location and orientation of the aerial unit only if a horizontal displacement between the ground unit and the aerial unit exceeds a tolerable horizontal displacement threshold.

iii. Calculating, based upon changes in values of the ground unit location information, a speed of the ground unit.

iv. Affecting at least one of the location and orientation of the aerial unit in response to the speed of the ground unit.

v. Calculating, based upon changes in values of the aerial unit location information, a speed of the aerial unit.

vi. Calculating required speed and orientation of the aerial unit required to reduce the horizontal displacement between the ground unit and the aerial unit below a predetermined horizontal displacement threshold.

vii. Constantly controlling the at least one of the first propeller motor and the at least one steering element while a speed of the ground unit exceeds a speed threshold.

viii. Preventing from controlling the at least one of the first propeller motor and the at least one steering element if a horizontal displacement between the ground unit and the aerial unit is below tolerable horizontal displacement threshold and the speed of the ground unit is below the speed threshold.

ix. Controlling at least one of the first propeller motor and the at least one steering element in response to at least the aerial unit metadata indicative of a location of the aerial unit and to the relationship between the aerial unit location information and the ground unit location information.

x. Controlling at least one of the first propeller motor and the at least one steering element in response to at least the ground unit metadata indicative of a location of the ground unit and to the relationship between the aerial unit location information and the ground unit location information.

xi. Controlling at least one of the first propeller motor and the at least one steering element in response to the connecting element orientation metadata, and the relationship between the aerial unit location information and the ground unit location information.

xii. Ignoring the aerial unit location information and the ground unit location information when a distance between the ground unit and the aerial unit is below a predetermined proximity threshold.

xiii. Ignoring connecting element orientation metadata when a distance between the ground unit and the aerial unit is above a predetermined proximity threshold.

xiv. Controlling at least one of the first propeller motor and the at least one steering element in response to the connecting element orientation metadata, and the relationship between the aerial unit location information and the ground unit location information.

Figure 19:
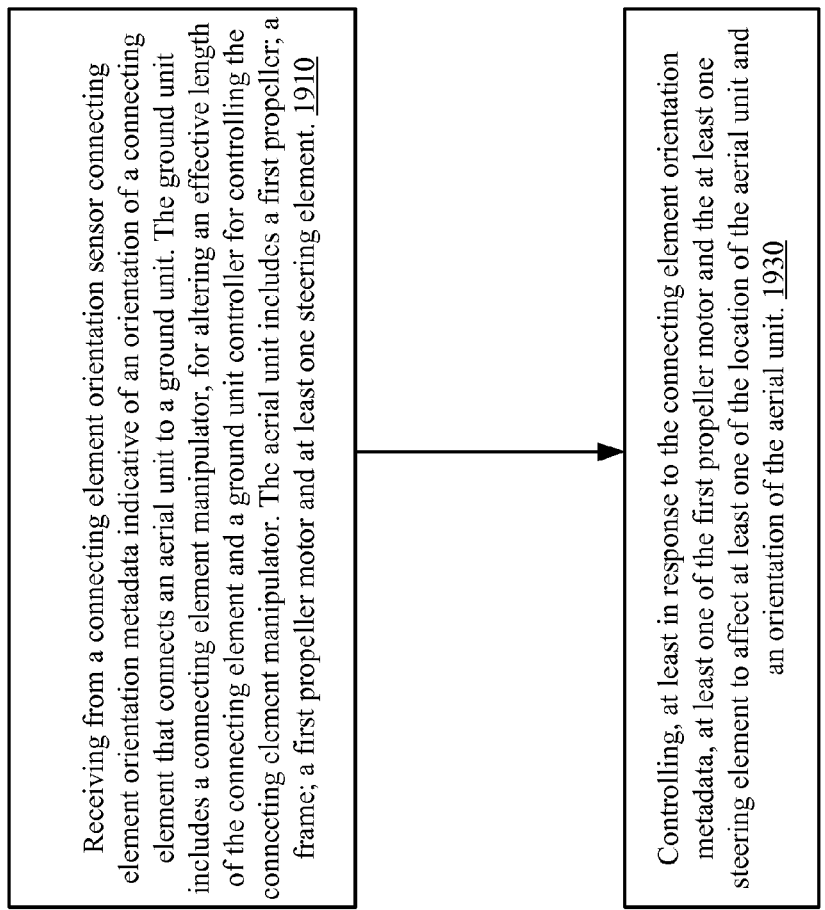
FIG. 19 is a flow chart of a method according to an embodiment of the invention.

FIG. 19 illustrates method 1900 according to an embodiment of the invention.

Method 1900 starts by stage 1910 of receiving from a connecting element orientation sensor connecting element orientation metadata indicative of an orientation of a connecting element that connects an aerial unit to a ground unit. The ground unit includes a connecting element manipulator, for altering an effective length of the connecting element and a ground unit controller for controlling the connecting element manipulator. The aerial unit includes a first propeller; a frame; a first propeller motor and at least one steering element.

Stage 1910 is followed by stage 1930 of controlling, at least in response to the connecting element orientation metadata, at least one of the first propeller motor and the at least one steering element to affect at least one of the location of the aerial unit and an orientation of the aerial unit.

Stage 1930 may include determining to ignore the connecting element orientation metadata and to control the at least one of the first propeller motor and the at least one steering element based upon information provided by at least one location sensor that differs from the connecting element orientation sensor. This determination may be performed if, for example, a distance between the ground unit and the aerial unit exceeds a predetermined proximity threshold.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

We claim:

1. A system, comprising:
a ground unit;
an aerial unit; and
a connecting element arranged to connect the ground unit to the aerial unit;
wherein the ground unit comprises:
a connecting element manipulator, for altering an effective length of the connecting element; wherein the effective length of the connecting element defines a distance between the ground unit and the aerial unit;
a ground unit controller for controlling the connecting element manipulator; and
a ground unit location sensor arranged to generate ground unit location information indicative of a location of the ground unit;
wherein the aerial unit comprises:
a first propeller;
a frame;
a first propeller motor that is configured to rotate the first propeller about a first axis, wherein the first propeller motor is connected to the frame;
a connecting element orientation sensor that is arranged to generate connecting element orientation metadata indicative of an orientation of the connecting element;
at least one steering element; and
an aerial unit location sensor arranged to generate aerial unit location information indicative of a location of the aerial unit;
wherein at least one of the ground unit and the aerial unit comprises a controller that is arranged to control, in response to at least one out the connecting element orientation metadata, and a relationship between the aerial unit location information and the ground unit location information, at least one of the first propeller motor and the at least one steering element to affect at least one of the location of the aerial unit and an orientation of the aerial unit.

2. The system according to claim 1, wherein the controller that is arranged to control the at least one of the first propeller motor and the at least one steering element in order to reduce the horizontal displacement between the ground unit and the aerial unit below a predetermined horizontal displacement threshold.

3. The system according to claim 1 wherein the controller is arranged to change the at least one of the location and orientation of the aerial unit only if a horizontal displacement between the ground unit and the aerial unit exceeds a tolerable horizontal displacement threshold.

4. The system according to claim 1, wherein the aerial unit location sensor and the ground unit location sensor are global positioning system (GPS) compliant sensors.

5. The system according to claim 1, wherein the aerial unit location sensor and the ground unit location sensor are arranged to calculate locations based upon satellite signals.

6. The system according to claim 1, wherein the controller that is arranged to calculate, based upon changes in values of the ground unit location information, a speed of the ground unit.

7. The system according to claim 6, wherein the controller is arranged to affect at least one of the location and orientation of the aerial unit in response to the speed of the ground unit.

8. The system according to claim 6, wherein the controller that is arranged to calculate, based upon changes in values of the aerial unit location information, a speed of the aerial unit.

9. The system according to claim 8, wherein the controller is arranged to calculate required speed and orientation of the aerial unit required to reduce the horizontal displacement between the ground unit and the aerial unit below a predetermined horizontal displacement threshold.

10. The system according to claim 6, wherein the controller that is arranged to constantly control the at least one of the first propeller motor and the at least one steering element while a speed of the ground unit exceeds a speed threshold.

11. The system according to claim 10, wherein the controller is arranged to be prevented from controlling the at least one of the first propeller motor and the at least one steering element if a horizontal displacement between the ground unit and the aerial unit is below tolerable horizontal displacement threshold and the speed of the ground unit is below the speed threshold.

12. The system according to claim 1, wherein the ground unit further comprises a positioning unit arranged to image the aerial unit and to generate aerial unit metadata about the location of the aerial unit; wherein the controller is arranged to control at least one of the first propeller motor and the at least one steering element in response to at least the metadata and to the relationship between the aerial unit location information and the ground unit location information.

13. The system according to claim 1, wherein the aerial unit further comprises a positioning unit arranged to image the ground unit and to generate ground unit metadata about the location of the ground unit; wherein the controller is arranged to control at least one of the first propeller motor and the at least one steering element in response to at least the ground unit metadata and to the relationship between the aerial unit location information and the ground unit location information.

14. The system according to claim 1, wherein the controller is arranged to ignore the aerial unit location information and the ground unit location information when a distance between the ground unit and the aerial unit is below a predetermined proximity threshold.

15. The system according to claim 1, wherein the controller is arranged to ignore connecting element orientation metadata when a distance between the ground unit and the aerial unit is above a predetermined proximity threshold.

16. The system according to claim 15, wherein the ground unit comprising a proximity sensor that is arranged to determine a relationship between (a) the predetermined proximity threshold and (b) the distance between the ground unit and the aerial unit.

17. The system according to claim 16 wherein the connecting element comprises a marker that is positioned at a location that corresponds to the predetermined proximity threshold and wherein the proximity sensor is arranged to detect the marker.

18. The system according to claim 1, wherein the controller is arranged to control the at least one of the first propeller motor and the at least one steering element in response to the connecting element orientation metadata and the relationship between the aerial unit location information and the ground unit location information.

19. A system, comprising:
a ground unit;
an aerial unit; and
a connecting element arranged to connect the ground unit to the aerial unit;
wherein the ground unit comprises:
a connecting element manipulator, for altering an effective length of the connecting element; wherein the effective length of the connecting element defines a distance between the ground unit and the aerial unit; and
a ground unit controller for controlling the connecting element manipulator;
wherein the aerial unit comprises:
a first propeller;
a frame;
a first propeller motor that is configured to rotate the first propeller about a first axis, wherein the first propeller motor is connected to the frame; and
at least one steering element;
a connecting element orientation sensor that is arranged to generate connecting element orientation metadata indicative of an orientation of the connecting element;
wherein at least one of the ground unit and the aerial unit comprises a controller that is arranged to control, at least in response to the connecting element orientation metadata, at least one of the first propeller motor and the at least one steering element to affect at least one of the location of the aerial unit and an orientation of the aerial unit.

20. A system, comprising: a ground unit; an aerial unit; and a connecting element arranged to connect the ground unit to the aerial unit; wherein the ground unit comprises: a connecting element manipulator, for altering an effective length of the connecting element; wherein the effective length of the connecting element defines a distance between the ground unit and the aerial unit; and a ground unit controller for controlling the connecting element manipulator; wherein the aerial unit comprises: a first propeller; a frame; a first propeller motor that is configured to rotate the first propeller about a first axis, wherein the first propeller motor is connected to the frame; and at least one steering element; a connecting element orientation sensor that is arranged to generate connecting element orientation metadata indicative of an orientation of the connecting element;
wherein at least one of the ground unit and the aerial unit comprises a controller that is arranged to determine to ignore the connecting element orientation metadata and to control at least one of the first propeller motor and the at least one steering element based upon information provided by at least one location sensor that differs from the connecting element orientation sensor;
wherein when the controller determines not to ignore the connecting element orientation metadata the controller is arranged to control, at least in response to the connecting element orientation metadata, the at least one of the first propeller motor and the at least one steering element to affect at least one of the location of the aerial unit and an orientation of the aerial unit.

21. The system according to claim 20, wherein the controller is arranged to determine to ignore the connecting element orientation metadata if a distance between the ground unit and the aerial unit exceeds a predetermined proximity threshold.

* * * * *